US011594980B2

(12) United States Patent
Hansen

(10) Patent No.: US 11,594,980 B2
(45) Date of Patent: Feb. 28, 2023

(54) THREE-PHASE SERIES VOLTAGE AND CURRENT REGULATOR/RECTIFIER

(71) Applicant: Wells Vehicle Electronics L.P., Fond Du Lac, WI (US)

(72) Inventor: David R. Hansen, Fond Du Lac, WI (US)

(73) Assignee: Wells Vehicle Electronics, L.P., Fond Du Lac, WI (US)

( * ) Notice: Subject to any disclaimer, the term of this patent is extended or adjusted under 35 U.S.C. 154(b) by 0 days.

(21) Appl. No.: 17/518,808

(22) Filed: Nov. 4, 2021

(65) Prior Publication Data

US 2022/0140745 A1    May 5, 2022

Related U.S. Application Data

(60) Provisional application No. 63/109,478, filed on Nov. 4, 2020.

(51) Int. Cl.
*H02M 7/217* (2006.01)
*H02M 1/084* (2006.01)
*H02M 1/00* (2006.01)

(52) U.S. Cl.
CPC ....... *H02M 7/2173* (2013.01); *H02M 1/0009* (2021.05); *H02M 1/084* (2013.01)

(58) Field of Classification Search
CPC ... H02M 7/2173; H02M 1/0009; H02M 1/084
See application file for complete search history.

(56) References Cited

U.S. PATENT DOCUMENTS

| 3,676,766 A * | 7/1972 | Blackmond ........... H02M 1/084 323/239 |
| 2022/0158581 A1* | 5/2022 | Oba ...................... H02P 27/085 |
| 2022/0166362 A1* | 5/2022 | Yamasaki ........... H02M 1/0009 |

* cited by examiner

*Primary Examiner* — Adolf D Berhane
(74) *Attorney, Agent, or Firm* — Barnes & Thornburg LLP; Mark J. Nahnsen

(57) ABSTRACT

Technologies for alternating current regulation controller include a controller configured to determine a voltage duty cycle based on a target voltage, and to determine a delay time based on the voltage duty cycle. The controller is coupled to input phases of an alternating current generator having multiple phases. Each phase is coupled to a silicon controlled rectifier. For each phase, the controller identifies a rising edge asserted on the input phase, waits the delay time after identifying the rising edge, and asserts an output pulse on an output driver coupled to the silicon controlled rectifier coupled to the input phase in response to waiting the delay time. Other embodiments are described and claimed.

16 Claims, 25 Drawing Sheets

THREE-PHASE SERIES VOLTAGE AND CURRENT REGULATOR/RECTIFIER

PRIORITY CLAIM

This application claims priority under 35 U.S.C. § 119(e) to U.S. Provisional Application Ser. No. 63/109,478, filed Nov. 4, 2020, which is expressly incorporated herein by reference in its entirety.

BACKGROUND

Vehicles, generating stations, and other systems may generate alternating current (AC) electrical power using an alternator, generator, or other electric machine. Such systems typically use a direct current (DC) rectifier to convert the AC power to DC power which may be used to charge one or more batteries, which are DC. Typical control methodologies may introduce voltage ripple seen on the output of the rectifier. Ripple is the residual periodic variation in voltage that remains after incomplete conversion of AC voltage to DC voltage.

SUMMARY

In illustrative embodiments, a controller is used for alternating current regulation control. The controller is configured to determine a voltage duty cycle based on a target voltage and determine a delay time based on the voltage duty cycle. Each input phase of an alternating current generator is coupled to a silicon controlled rectifier. The controller is also configured to identify a rising edge asserted on the input phase and is adapted to wait the delay time after identifying the rising edge. The controller asserts an output pulse on an output driver coupled to the silicon controlled rectifier coupled to the input phase in response to waiting the delay time. The controller is configured to identify the rising edge asserted on the input phase and is configured to deglitch filter the input phase.

In illustrative embodiments, the controller is further configured to measure output current of the silicon controlled rectifiers and determine a current compensation value in response to measuring the output current. The controller reduces the target voltage by the current compensation value and is configured to determine the voltage duty cycle based on the target current. To determine the voltage duty cycle the controller periodically measures the voltage of a battery coupled to the silicon controlled rectifiers. To determine the voltage duty cycle the controller filters the voltage of the battery to generate a filtered voltage and determines the voltage duty cycle based on the filtered voltage. To determine the voltage duty cycle the controller uses a proportional-integral-derivative control routine based on the filtered voltage and the target voltage.

In illustrative embodiments, the controller determines the voltage duty cycle by measuring output current of the silicon controlled rectifiers and filters the output current to generate a filtered current and determines the voltage duty cycle based on the filtered current. The controller determines the voltage duty cycle with a proportional-integral-derivative control routine based on the filtered current and a target current. The controller is further configured to measure a frequency of each input phase of the alternating current generator and filters the frequency of each input phase to generate a filtered system frequency.

In illustrative embodiments, the controller determines an active signal time for an input phase of the plurality of phases and filters the active signal time to generate a filtered active signal time. The controller determines the delay time based on the voltage duty cycle and the filtered active signal time. The controller is also configured to detect a fault condition and suppress output of one or more of the silicon controlled rectifiers in response to detecting the fault condition. The fault condition can include a phase fault, an over-temperature fault, a battery sense fault, or an over-voltage fault.

In illustrative embodiments, the silicon controlled rectifiers comprises a plurality of high-side silicon controlled rectifiers, and the controller is configured to activate the plurality of low-side silicon controlled rectifiers coupled to the plurality of phases while operating in a normal mode. The controller can also activate the plurality of low-side silicon controlled rectifiers in response to waiting the delay time while operating in a trim mode.

In illustrative embodiments, the controller provides a method for alternating current regulation control by determining a voltage duty cycle based on a target voltage, and determining a delay time based on the voltage duty cycle. For each input phase of an alternating current generator having a plurality of phases, wherein each phase is coupled to a silicon controlled rectifier of a plurality of silicon controlled rectifiers, the controller identifies a rising edge asserted on the input phase, waits a delay time after identifying the rising edge, and asserts an output pulse on an output driver coupled to the silicon controlled rectifier coupled to the input phase in response to waiting the delay time. The controller identifies the rising edge asserted on the input phase and causes deglitch filtering the input phase.

The controller also provides a method for measuring output current of the silicon controlled rectifiers, determining a current compensation value in response to measuring the output current and reducing the target voltage by the current compensation value. The controller also determines the voltage duty cycle based on a target current.

In illustrative embodiments, the controller determines the voltage duty cycle by periodically measuring voltage of a battery coupled to the plurality of silicon controlled rectifiers. The controller determines the voltage duty cycle by filtering the voltage of the battery to generate a filtered voltage and determines the voltage duty cycle based on the filtered voltage. The controller determines the voltage duty cycle by determining the voltage duty cycle with a proportional-integral-derivative control routine based on the filtered voltage and the target voltage. The controller determines the voltage duty cycle by measuring output current of the plurality of silicon controlled rectifiers, filtering the output current to generate a filtered current, and determining the voltage duty cycle based on the filtered current. The controller determines the voltage duty cycle with a proportional-integral-derivative control routine based on the filtered current and a target current.

In illustrative embodiments, the controller measures a frequency of each input phase of the alternating current generator and filters the frequency of each input phase to generated a filtered system frequency. The controller determines an active signal time for an input phase of the plurality of phases and filters the active signal time to generate a filtered active signal time. The controller determines the delay time based on the voltage duty cycle and the filtered active signal time. The controller can detect a fault condition and suppress the output of one or more of the plurality of silicon controlled rectifiers in response to detecting the fault condition. The controller can detect a phase fault, an over-temperature fault, a battery sense fault, or an over-voltage fault.

In illustrative embodiments, the plurality of silicon controlled rectifiers include a plurality of high-side silicon controlled rectifiers. The controller activates the low-side silicon controlled rectifiers coupled to the plurality of phases while operating in a normal mode. Alternatively the controller can activate the low-side silicon controlled rectifiers in response to waiting the delay time while operating in a trim mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
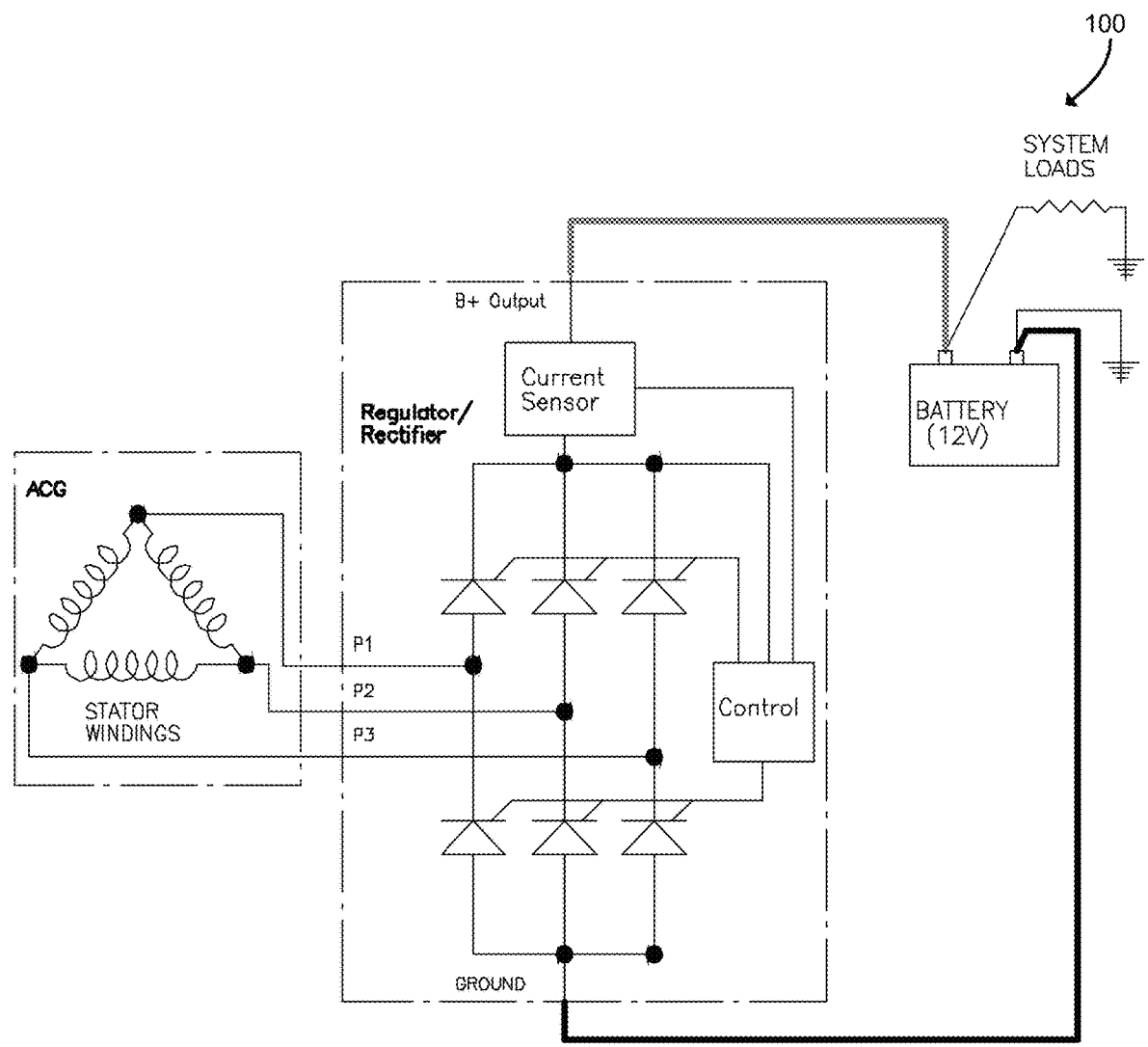
FIG. 1 is a simplified block diagram of at least one embodiment of a system for three-phase regulation/rectification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for three-phase regulation/rectification is shown. The system 100 includes a control circuit and method to control the voltage and or current output of a permanent magnet charging system. The system 100 as disclosed reduces the voltage ripple seen on the output over other, existing control methodologies. Although described as a 3 phase system, it should be understood that the methodology described herein can also be applied to a signal phase system with similar benefits.

A controller or other control circuit is coupled to multiple SCRs (Silicon Controlled Rectifiers) that rectify (when fired on) the AC signal coming from the AC input phases. A silicon controlled rectifier or semiconductor controlled rectifier is a four-layer solid-state current-controlling device. The name "silicon controlled rectifier" is General Electric's trade name for a type of thyristor. Silicon-controlled rectifiers are a subset of thyristors. In use, first, the circuit senses the phase inputs. If the voltage level is below a certain level the circuit goes to low power, standby mode. When any of the 3 inputs is high enough, the circuit goes to operation mode. The low to high threshold is used to determine the rising edge of the phase. Output to the SCRs is delayed by a required amount to set a required duty cycle. The duty cycle required is determined by the voltage level of the battery or current output measured via a sense circuit. All voltage and current controls are calculated to give equal duty cycles to each of the phase outputs; that is, the same duty cycle is used for all phases for both voltage and current regulation.

The ripple seen on the output in this type of system is a function of current switched to the system. A three phase system reduces the current and time between output pulses, but if any output is significantly higher than the other, a surge may be created (still meeting a current requirement, but causing a short term higher voltage, i.e., ripple). To ensure low ripple all the output channels are switched on at the same duty cycle. This is done by first determining a master phase (first phase the meets threshold requirements) and at that time determining the duty cycle requirement. Then this duty cycle is locked in for one cycle and applied to the other 2 outputs. Given all 3 outputs have the same on time the current output is equally shared. The required duty cycle is continuously monitored and is determined with averaging and filtering so that when the next cycle is locked in the system voltage (or current) is maintained at the required level. The control method also uses a PID control loop (Proportional, Integral, Derivative) to ensure the proper output setting. PI control by itself may be utilized depending on the application. The I and D terms may be disabled during low frequency operation to allow ease of setting voltage regulation target.

Figure 2:
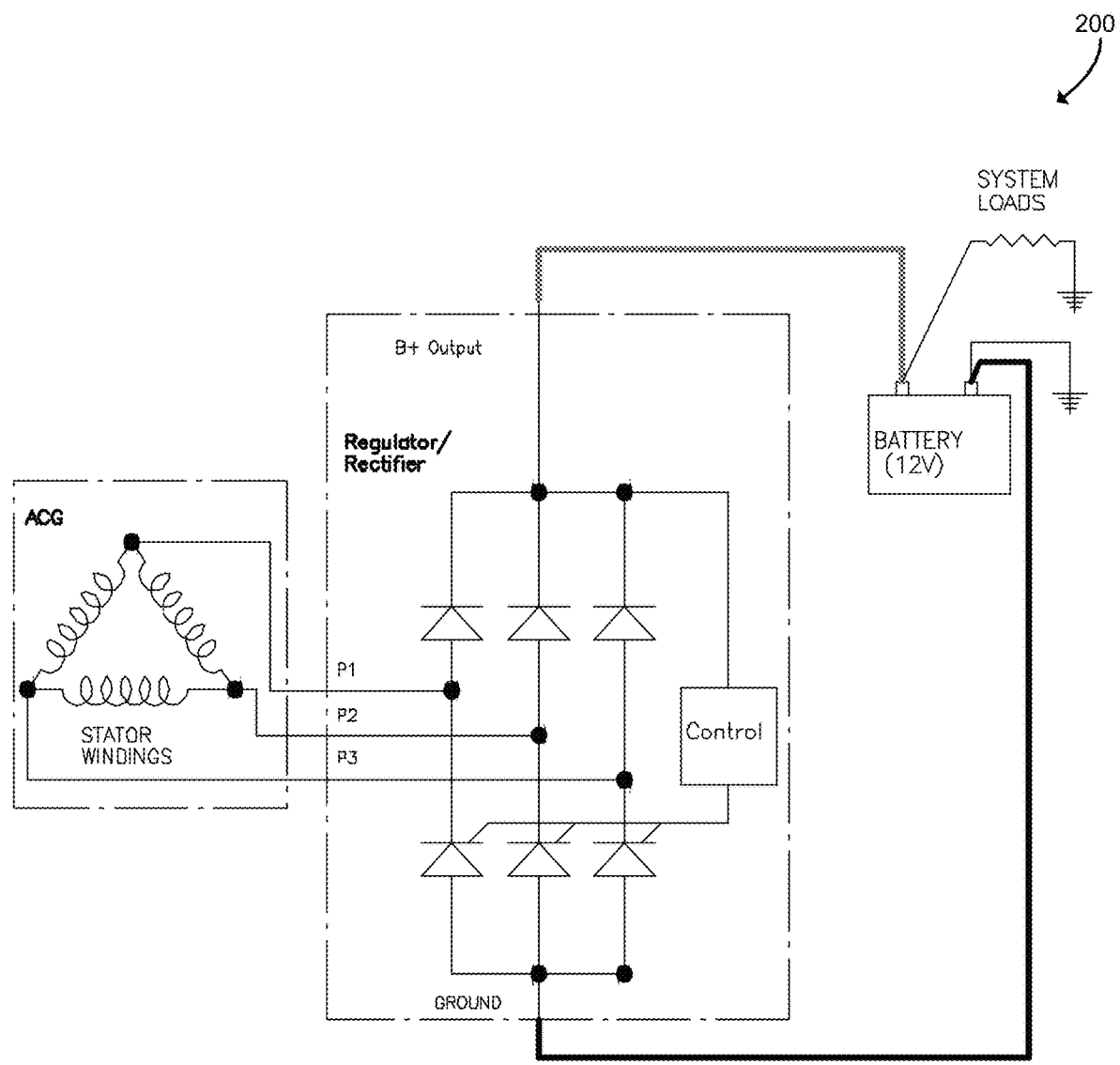
FIG. 2 is a simplified block diagram of at least one other embodiment of a system for three-phase regulation/rectification.
Figure 3:
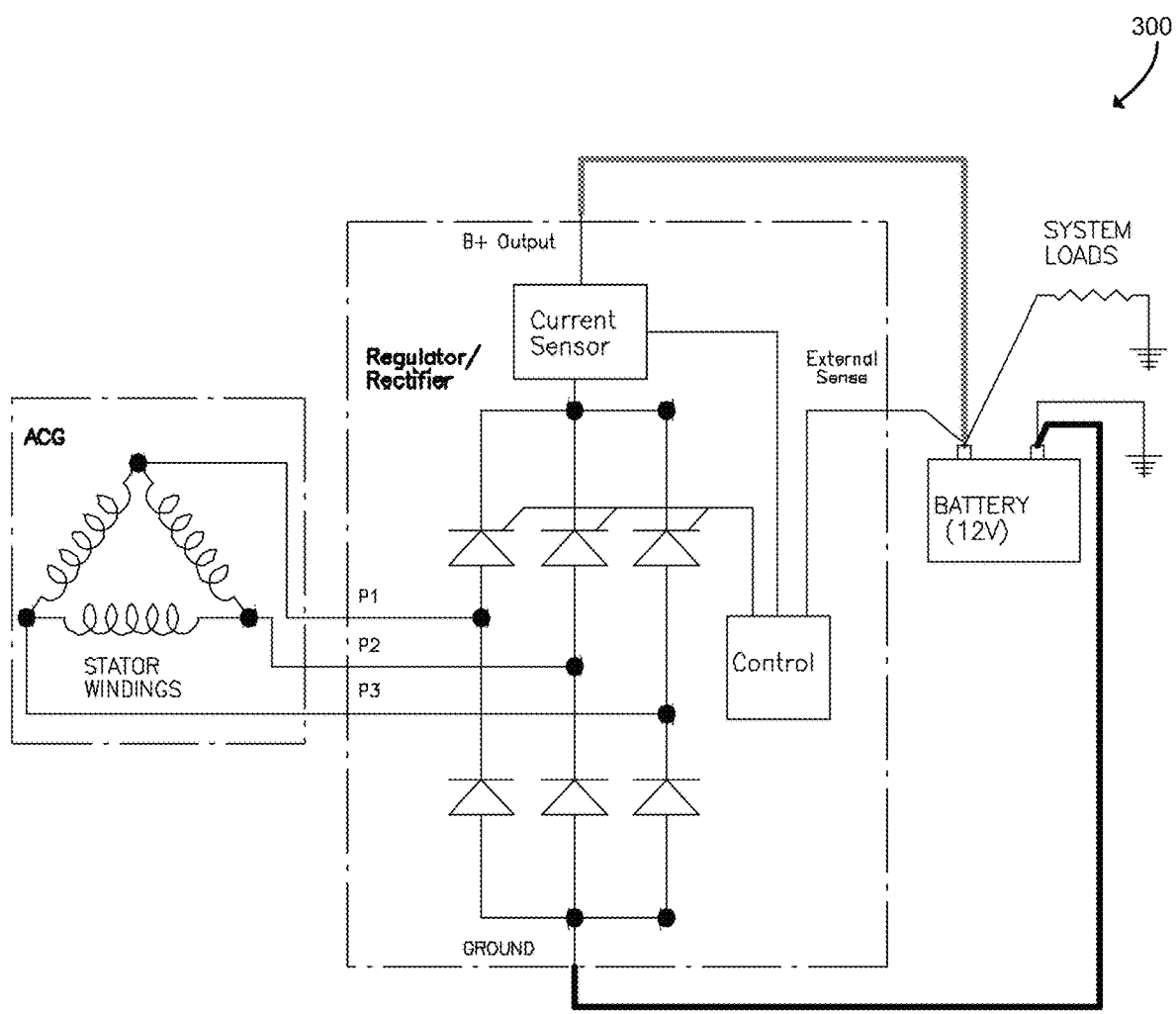
FIG. 3 is a simplified block diagram of at least one other embodiment of a system for three-phase regulation/rectification.

Three possible output schemes may be utilized and controlled by the control circuit. A scheme with six SCRs, as shown in FIG. 1, may afford the most system protection during a fault. A scheme with three SCRs on the high side and three diodes on low side may afford protection when a phase to ground short occurs. One embodiment of a system 300 with three SCRs on the high side and three diodes on the low side is shown in FIG. 3. A scheme with three diodes on the high side and three SCRs on the low side may provide lowest cost. One embodiment of a system 200 with three diodes on the high side and three SCRs on the low side is shown in FIG. 2.

Major functions of the control circuit include detection of valid signals on any of the phase inputs to determine if the inputs should be in active or sleep modes; controlling/regulating the output voltage to maintain battery charge, and controlling/regulating the output current if it becomes too high. Major functions may also include detecting an overvoltage condition and going into protection mode. In protection mode, the required duty cycle determined can be overridden by fault such as over voltage for system protection. Major functions may also include detecting an over temperature condition and going into protection mode. The control circuit as disclosed herein incorporates a two stage thermal shut down scheme. When a first level is detected, the circuit attempts to limit the current output to a safe level. If the temperature continues to climb and exceeds a second level, output will be turned off 100% until temperature has dropped below level one. This cutback also has a hysteresis so that, when exceeded, temperature must go below a third level to re-enter normal mode.

SCRs need a current pulse >= to their IGH to be latched "ON." The control circuit as disclosed herein affords different pulse times depending on operating frequencies. This ensures that at low frequencies SCR drive is not distorted, while at higher RPMs pulse time is minimized and thereby drive power dissipation is minimized.

Figure 4:
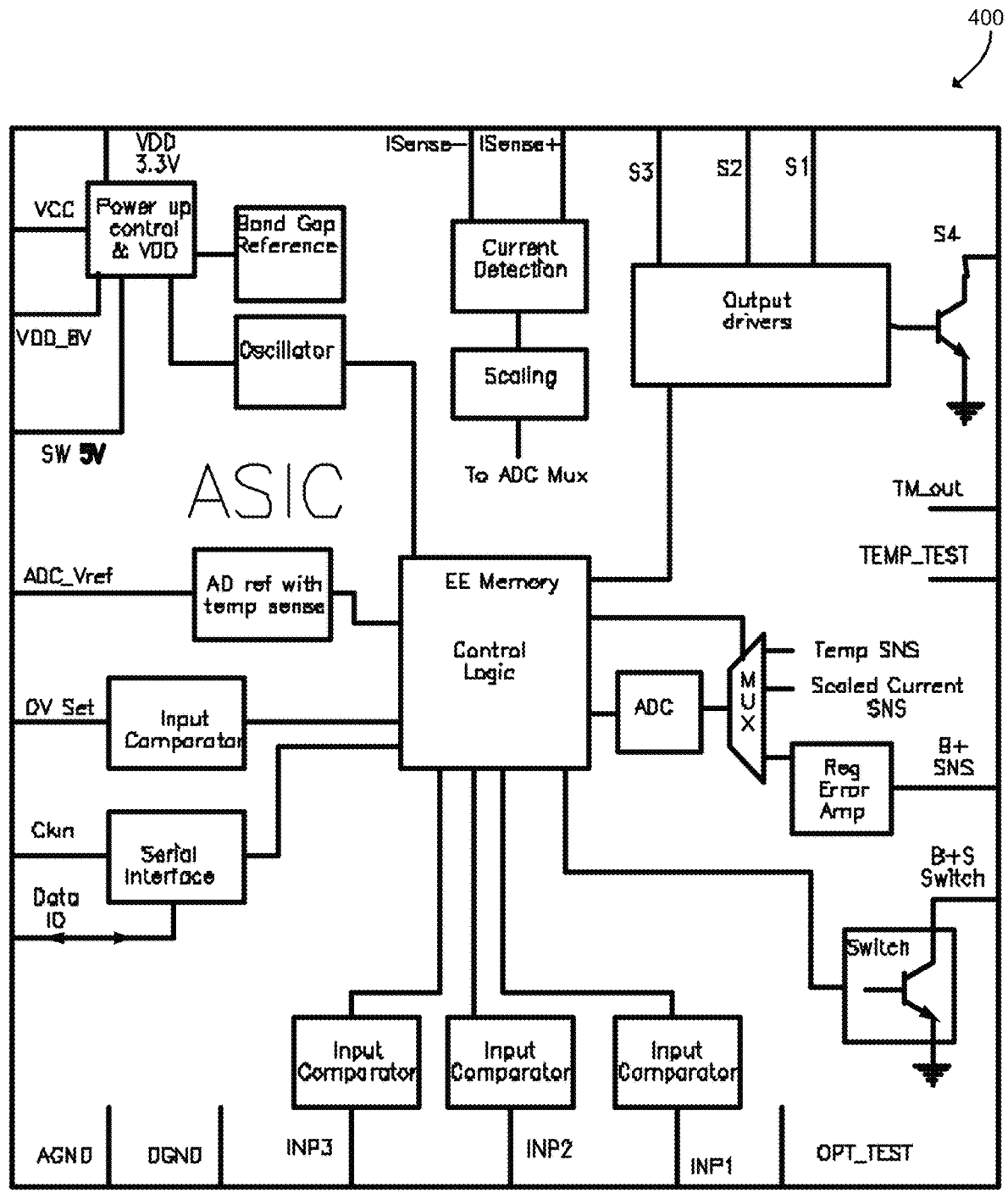
FIG. 4 is a simplified block diagram of a controller for three-phase regulation/rectification control of any of the systems of FIGS. 1-3.

Referring now to FIG. 4 a controller 400 for three-phase regulation/rectification is shown. The controller 400 may be used with any of the systems 100, 200, 300 shown in FIGS. 1-3 and described above. Input comparators INP1, INP2, INP3 may be coupled to input phases from an alternator or other AC generator. Each input phase may be coupled to a deglitch filter, which may remove input glitches or other spurious signal transitions. Each of output drivers S1, S2, S3 may be coupled to a corresponding high-side SCR, and output driver S4 may be coupled to low-side SCRs. The controller may be embodied as a microcontroller, microprocessor, digital signal processor (DSP), application specific integrated controller (ASIC), field-programmable gate array (FPGA), or other control circuit capable of performing the operations described herein. Accordingly, the controller 400 may include or be coupled to one or more volatile or non-volatile memory or data storage, including memory devices (DRAM, EPROM, EEPROM, etc.), firmware devices, and/or data storage devices. The controller 400 may execute one or more control methods as described below in connection with FIGS. 5-18. Controller pin functions are shown in the table below:

| PIN SYMBOL | FUNCTION | Type |
| --- | --- | --- |
| S1 | SCR1 output drive | Digital Output |
| S3 | SCR3 output drive | Digital Output |
| SW5V | Switched 5 V regulator output Bypass cap = 100 nF//470 nF | Power Output |
| OV Set | Failsafe Overvoltage adjust pin | |
| TM_ANA_OUT | Analog Test mux output | |
| INP1 | Phase input 1 | Analog Input |
| INP2 | Phase input 2 | Analog Input |
| INP3 | Phase input 3 | Analog Input |

-continued

| PIN SYMBOL | FUNCTION | Type |
|---|---|---|
| Temp_test | Temperature test pin (In Scan Test Mode, it becomes the digital Scan Enable input.) | Analog/Digital Input |
| Opt_Test | Basic mode Option select or ASIC level test muxed pin Opt_Test = 1, Normal operation Opt_Test = 0, Inverted phase operation | Digital Input |
| VDD_3.3V | Internal ASIC 3.3 V regulator output bypass capacitor connection Bypass cap = 100 nF | Power Output |
| DGND | Digital Ground connection | Digital Logic Ground |
| ADC V_ref | Analog to digital reference capacitor Bypass cap = 100 nF | Analog Output |
| SCL | Serial clock input pin | Digital Input |
| SDA | Serial data pin | Digital IO |
| Current Sense+ | Input for current detection. | Analog Input |
| Current Sense− | Input for current detection. | Analog Input |
| B+ Sswitch | B+ supply switch | Digital Output (open drain) |
| B+ SNS | BPLUS internal voltage sense | Analog Input |
| Vcc | Input supply voltage | Power Input |
| A GND | Analog Ground connection | Analog Power Ground |
| VDD_8V | Internal ASIC 8 V regulator output bypass capacitor connection Bypass cap = 100 nF | Power Output |
| S4 | SCR4-5-6 output drive | Digital Output |
| S2 | SCR2 output drive | Digital Output |

Figure 5:
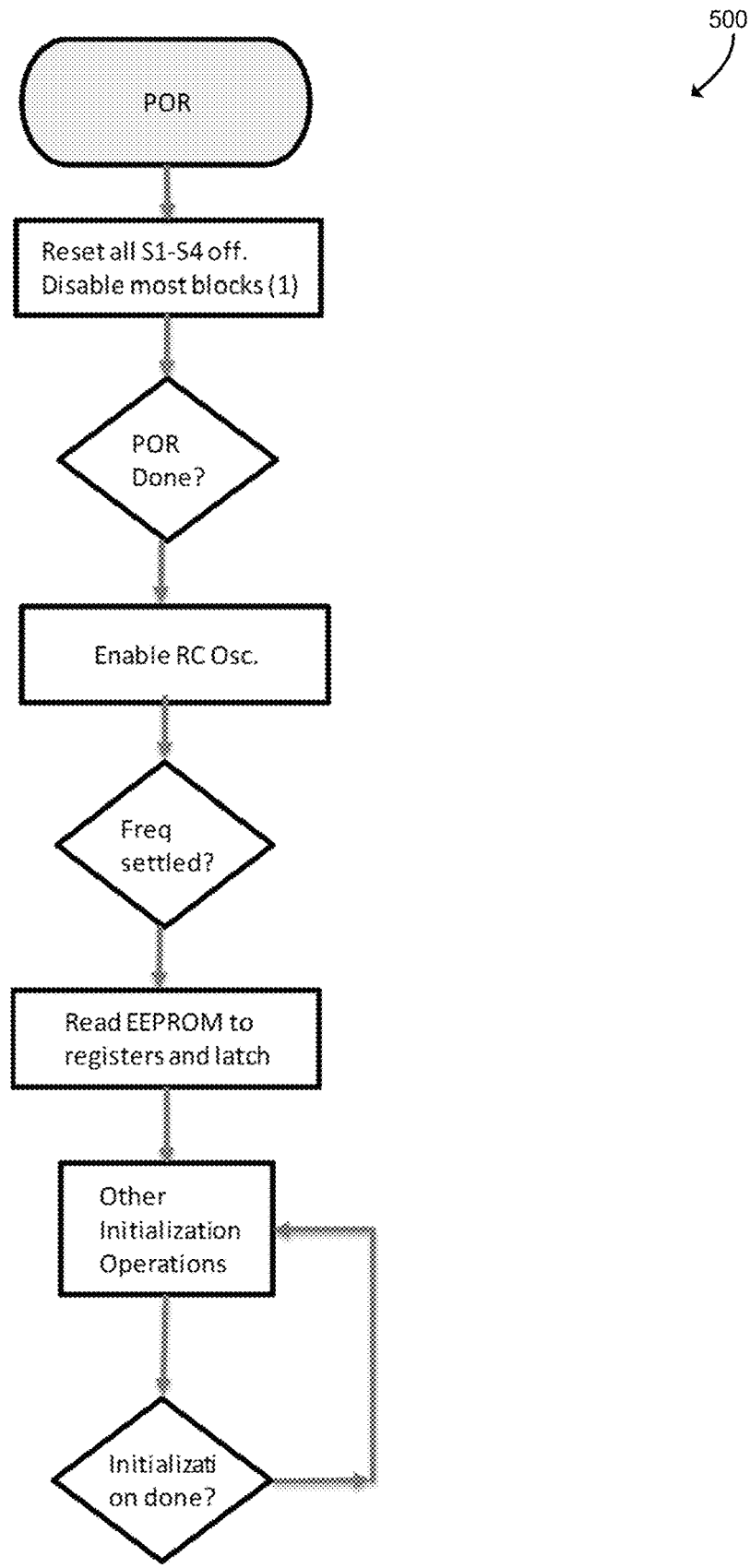
FIG. 5 is a simplified flow diagram of at least one embodiment of a method for power on reset that may be executed by the controller of FIG. 4.
Figure 6:
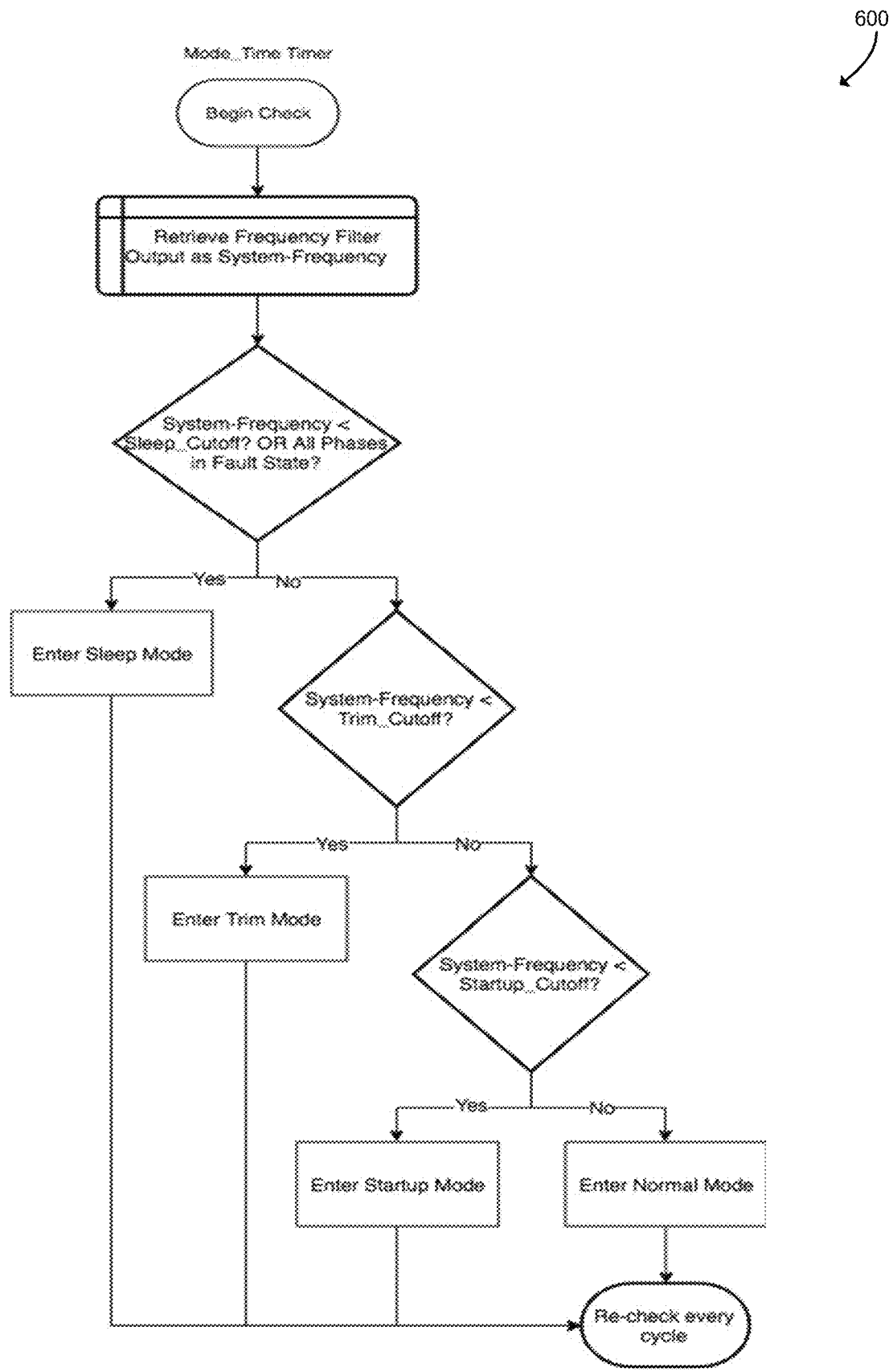
FIG. 6 is a simplified flow diagram of at least one embodiment of a method for mode selection that may be executed by the controller of FIG. 4.

Referring now to FIG. 5, the controller 400 may execute a method 500 for power on reset (POR). As shown, after reset, the controller resets all output drivers to off, enables the oscillator, reads EEPROM, and performs other initialization operations. Referring now to FIG. 6, the controller 400 may execute a method 600 for mode selection. The controller/regulator has four major functional states, which shall be determined by the System-Frequency. System-frequency is based on signals measured on the input phases and may be determined using a frequency filter as described further below in connection with FIG. 13. The modes, and their trigger conditions, are as follows: Sleep Mode (System-Frequency<Sleep_Cutoff OR All Phases in Fault States); Trim Mode (Sleep_Cutoff<System-Frequency<Trim_Cutoff); Startup Mode (Trim_Cutoff<System-Frequency<Startup_Cutoff); and Normal Mode (Startup_Cutoff<System-Frequency). At each of the mode transitions, there may be a zone of hysteresis to prevent rapid switching between modes. The hysteresis zone extends above and below each cutoff value by Mode_Hysteresis, for a total width centered on each cutoff of 2*Mode_Hysteresis (not shown in FIG. 6).

The primary details set by these modes are the low side control mode, Output-Pulse-Time, and the state of PID control. The details of each mode are as follows.

In Sleep Mode, the device ceases operation besides monitoring for next wakeup. Upon entering sleep, the following values should be reset to default state (zero unless stated otherwise): The sum error of each PID loop; Battery-Voltage (and the stored Battery filter values); System-Current (and the stored Current filter values) Input-Pulse-Time (and the stored Phase filter values); DC-Delay-Time. A switched supply pin (SW VDD control) is used to power external circuitry as a 5V supply. In sleep mode, SW VDD control is OFF and when wake/active, this pin supplies +5V to the resistor divider networks. This function helps minimizes current consumption during sleep mode. One potential method for Sleep Mode is described below in connection with FIG. 7.

In Trim Mode, the device enters a special mode for production purposes. The device disables integral and Differential Control for Battery PID loop. The device resets Sum Error and Last Process Value to 0 before leaving this mode to prevent them from influencing later control if going to higher frequency modes. Depending on the state of system in test rig, current control may need to be disabled during this mode. Output-Pulse-Time is set to Pulse_Time_Trim, and Low Side Control is set to Active Control as described further below in connection with FIG. 10. Pulse_Time_Trim may be a programmable value set in EEPROM and in some embodiments may be about 7168 µs. This mode requires a constant +50% offset to the Duty-Cycle such that when Battery-Voltage is equal to the Target_Battery, the device outputs 50% duty cycle.

In Startup Mode, the device enters a special mode to handle low frequencies. The device sets Output-Pulse-Time to Pulse_Time_Startup, and sets Low Side Control to Always On, as described further below in connection with FIG. 10. Pulse_Time_Startup may be a programmable value set in EEPROM, and may be smaller than Pulse_Time_Trim (e.g., 3200 µs as compared to 7168 µs). The PID Control operates normally.

In Normal Mode, the device sets Output-Pulse-Time to Pulse_Time_Standard, and sets Low Side Control to Always On as described further below in connection with FIG. 10. Pulse_Time_Standard may be a programmable value set in EEPROM and may be smaller than Pulse_Time_Startup (e.g., 52 µs as compared to 3200 µs). PID Control operates normally. One potential embodiment of a method for normal mode operation is described below in connection with FIG. 9.

Figure 7:
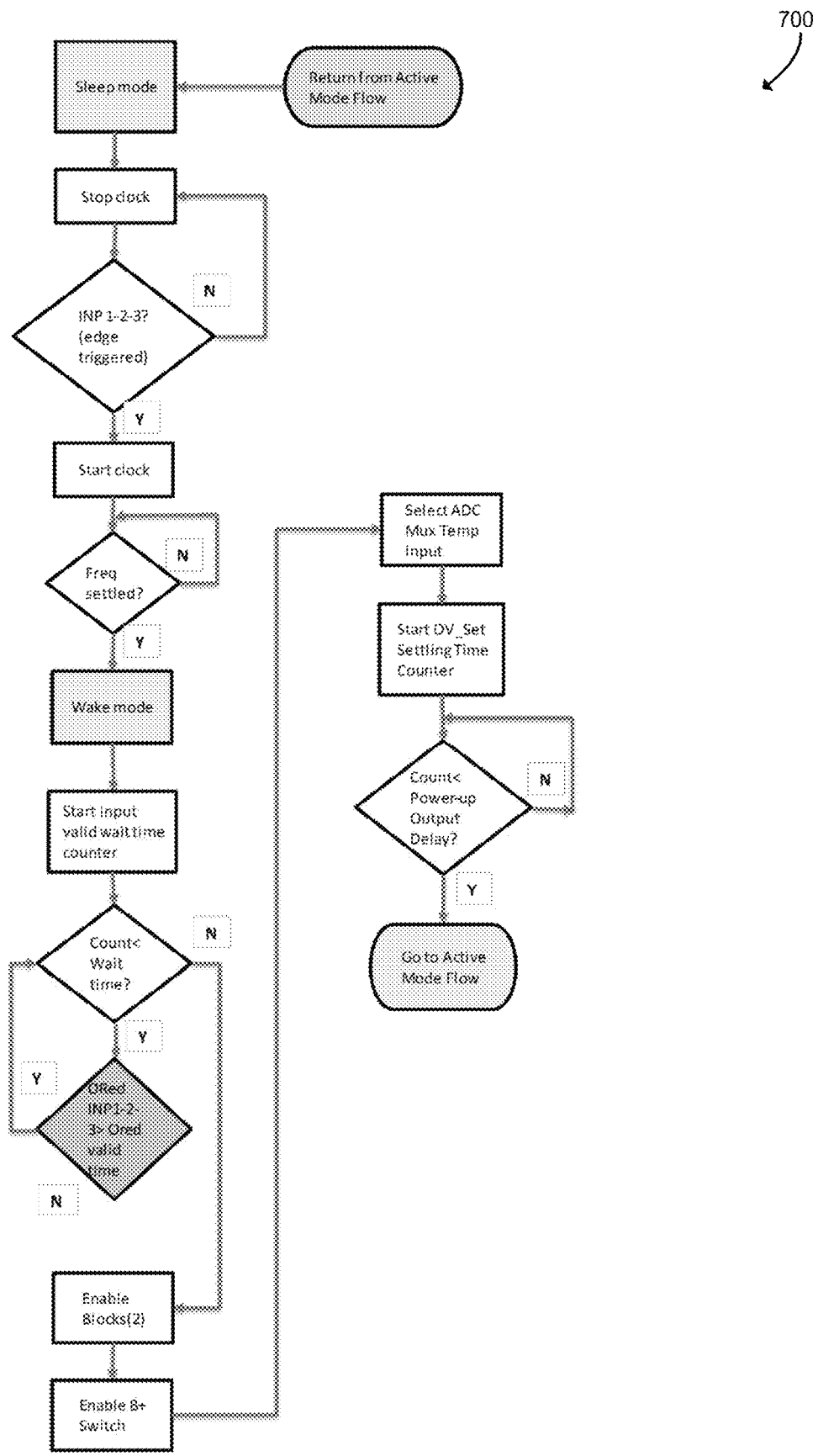
FIG. 7 is a simplified flow diagram of at least one embodiment of a method for sleep/wake mode transition that may be executed by the controller of FIG. 4.
Figure 8:
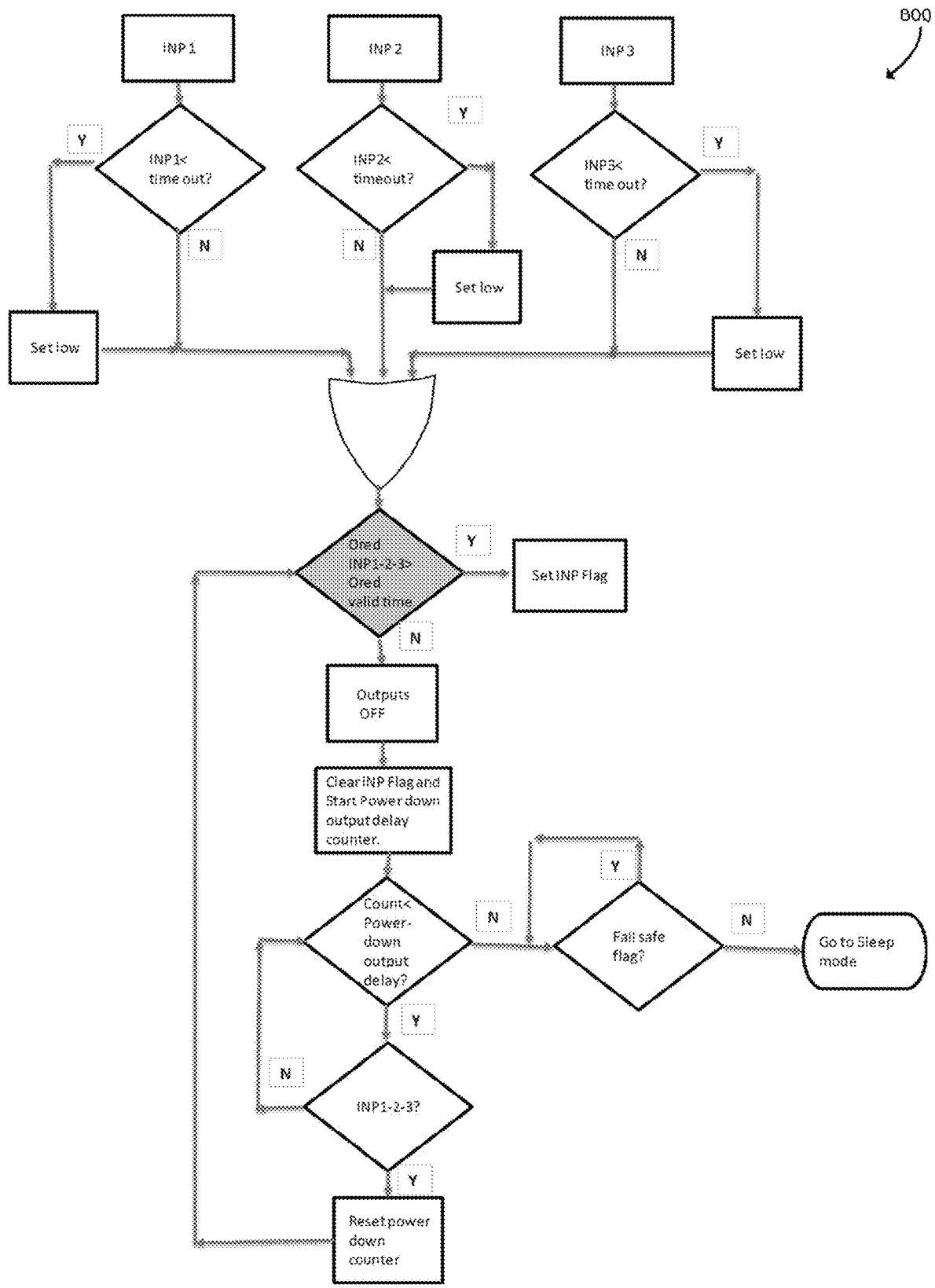
FIG. 8 is a simplified flow diagram of at least one embodiment of a method for input monitoring may be executed by the controller of FIG. 4.

Referring now to FIG. 7, the controller 400 may execute a method 700 for sleep/wake mode transition. Referring now to FIG. 8, the controller 400 may execute a method 800 for input monitoring. The controller senses the voltage at the INP1, INP2, and INP3. When this voltage is less than the threshold voltage, the controller is in sleep mode with outputs S1, S2, and S3 held low and S4 held high (open), referred to as "Inactive State." When the peak voltage rises above the threshold voltage, the controller wakes from sleep and starts the oscillator (wake mode). After ORed input valid time the controller enables the low voltage switch B+SSwitch and enables Sw VDD. (Active mode). If the ORed input valid time is not exceeded, the controller returns to sleep mode. After B+SSwitch and Sw VDD are enabled, S outputs will be held in "Inactive state," until after a power up delay time. At the end of the power up delay time the Temp and OV set pins are checked. If either fault condition (Temp or Overvoltage Max exceeded), the SCR output shall remain disabled (no glitches) until Temp limit1 (hysteresis temperature) and OV fault conditions are cleared. Potential embodiments of methods for fault monitoring are described further below in connection with FIGS. 16-18. After all fault conditions are cleared, normal regulation mode shall be entered.

Figure 9:
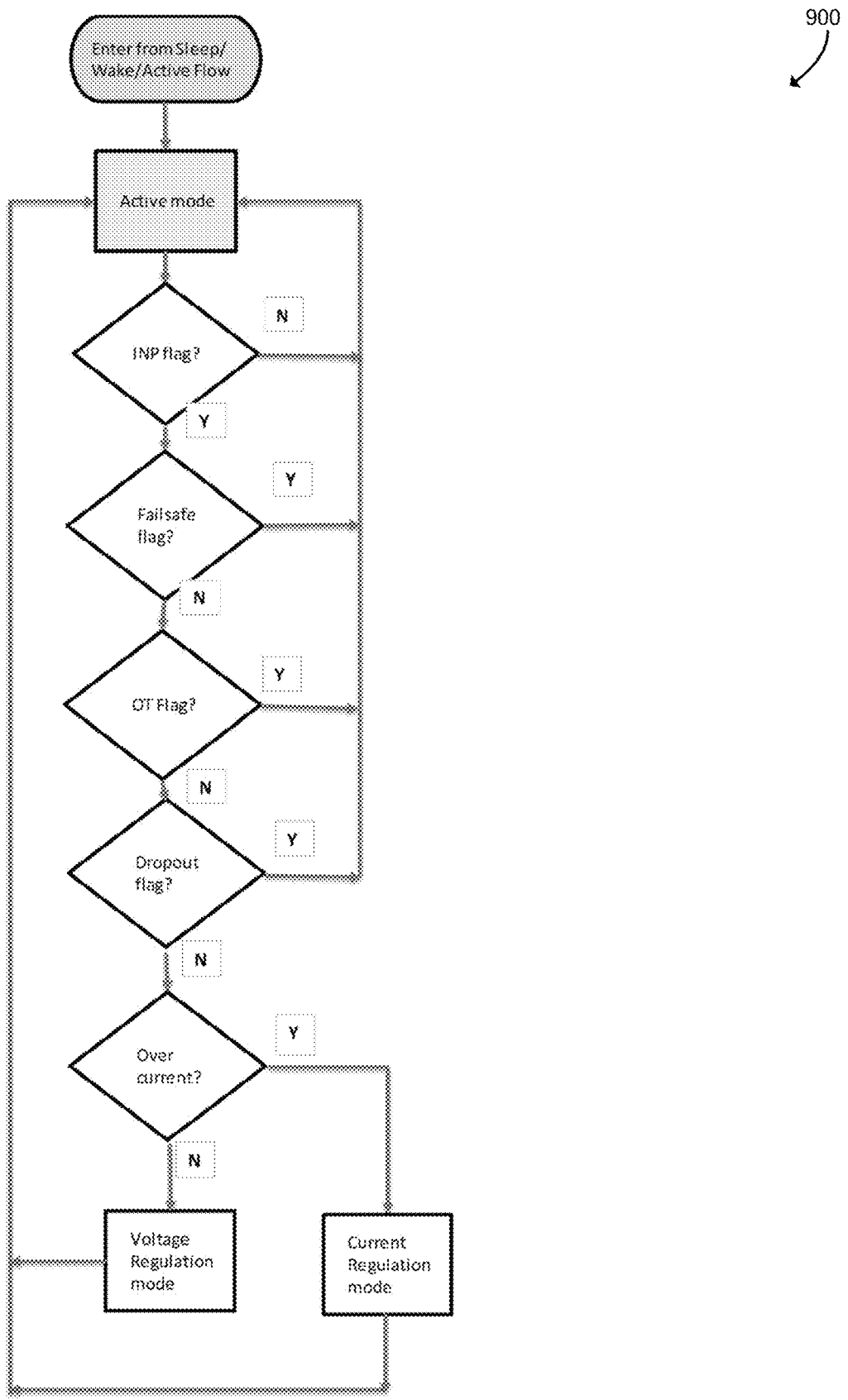
FIG. 9 is a simplified flow diagram of at least one embodiment of a method for operation in active mode that may be executed by the controller of FIG. 4.

Referring now to FIG. 9, the controller 400 may execute a method 900 for operation in active mode. If valid INP signals are lost for Power-down output Delay, the controller returns to sleep. Once Power-down delay is started it will be reset and begin again if ORed input>ORed Input Power-down delay reset Pulse width. This time is after Active mode is entered. When detectable signals are lost from INP1, INP2, INP3 the regulator will first go to wake mode then after sleep delay time enters sleep mode (disabling outputs, B+SSwitch, SW Vdd, etc).

In voltage regulation mode, the SCR drive outputs are switched on or off depending upon the voltage on the active sense pin (B+Sense). This provides closed loop regulation of the output voltage by controlling the ON state of the SCRs, i.e., when the output voltage exceeds the upper limit, the SCRs are disabled (OFF) and when below the lower limit, the SCRs are enabled (ON). The SCR drive outputs will also be synced to the phase INP signals such that a pwm control for each channel is achieved. This will in effect delay the switch on of each SCR equally for each phase proportional to the deviation amount away from nominal. S1, S2, S3 controls the upper 3 SCRs respectfully and S4 switches the lower 3 SCRs on. For each cycle, all outputs will be switched at the same duty cycle, ensuring balanced output.

In current regulation mode, current sense +/− pins are used to measure the voltage drop across a sense resistor. This is then used to override the normal voltage regulation function. To accomplish this the controller will first average the input voltage. When the average Voltage (converted current) trip limit is exceeded, the S1-S4 output drivers will be duty cycled equally to limit the average current.

PWM control: Outputs shall be controlled to have the same duty cycle (except S4 in normal mode) with update to this duty cycle determined at beginning of S1-S3 cycle. Two mode of control are afforded: 1) Trim mode, which will switch S1-4 outputs. This is at low frequencies denoted by trim_mode_Freq. Duty cycle of the SCR is define by % of input high time. When in this mode, S4 will be switched on in conjunction with any S1-S3 output; and 2) Normal operation. In this mode the S4 output will be always on, and only S1-S3 will control. This shall be only overridden by a fault condition. For current regulation S1, S2, S3 shall control DC with S4 at 100%.

Figure 10:
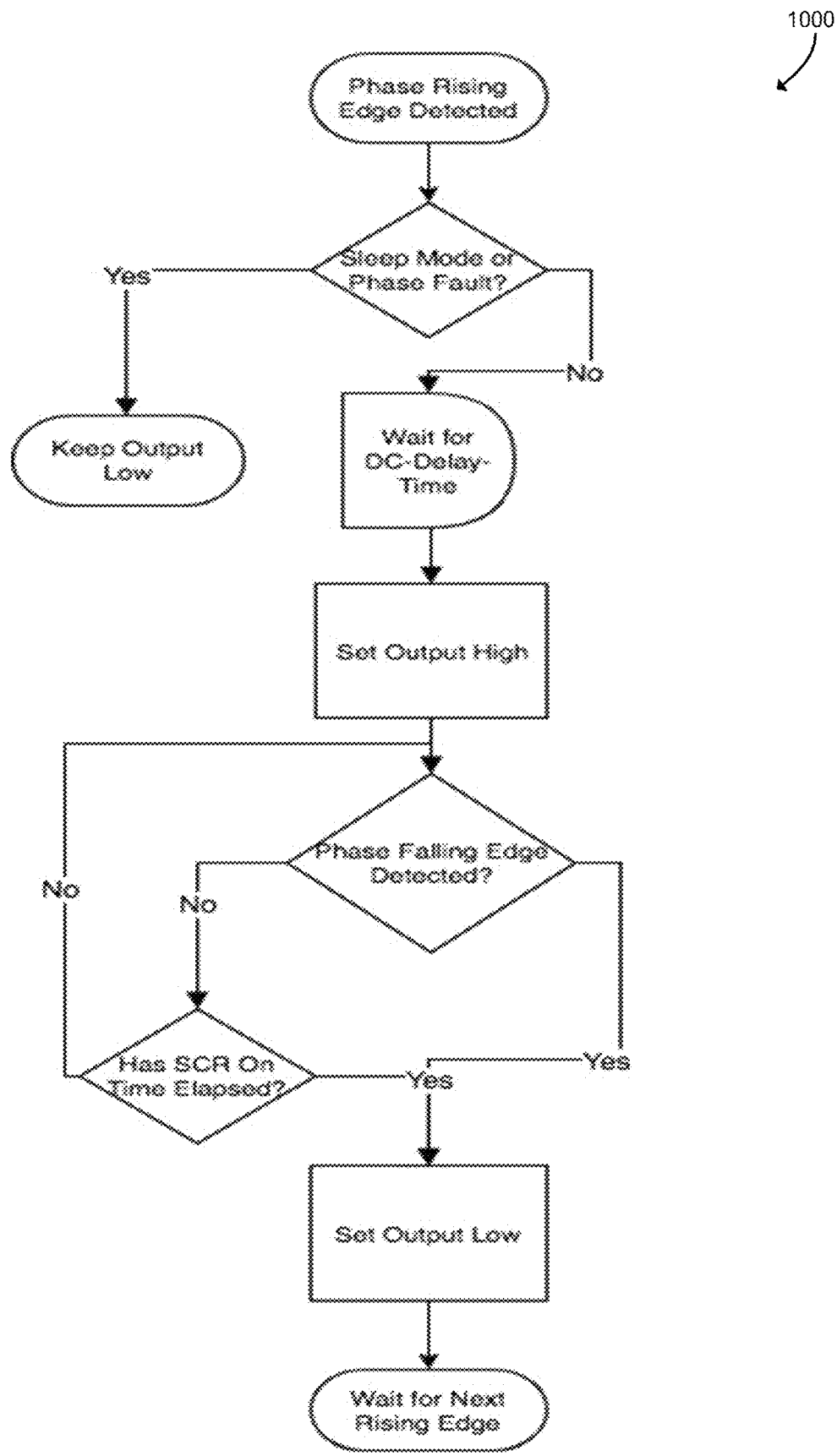
FIG. 10 is a simplified flow diagram of at least one embodiment of a method for silicon controlled rectifier actuation that may be executed by the controller of FIG. 4.

Referring now to FIG. 10, the controller 400 may execute a method 1000 for silicon controlled rectifier actuation. High side control is split between 3 different output phases, each corresponding to one of the 3 input phases. The operations of method 1000 may apply to output drivers for high-side SCRs (e.g., S1, S2, S3). The operations of method 1000 may also apply to an output driver for a low-side SCR (e.g., S4) in Trim Mode.

When an input phase goes high, after a time dictated by DC-Delay-Time has passed, the associated output phase is set high. DC-Delay-Time may be determined in the primary control loop as described further below in connection with FIG. 11. The output phase will remain high for a time equal to Output-Pulse-Time, then go low until the next trigger. If the input phase goes low at any time during DC_Delay_Time, or Output-Pulse-Time, the output phase is prematurely disabled.

For low-side control (e.g., S4), the low side output may function in two states: Active Control, and Always On. In the Active Control state, the low side output will function as an OR gate of the 3 high side outputs, going high any time one of the high side outputs goes high. In some embodiments, the Output-Pulse-Time time for the low side may be longer than that of the high side and separately configurable, or remaining on until the associated input goes low. In the Always On state, the low side output will be high at all times unless suppressed. If possible, it may be preferable for low side outputs to have separate suppression triggers than the high side, so in some cases if the high side is suppressed the low side may still follow the input or remain on, depending on mode.

Figure 11:
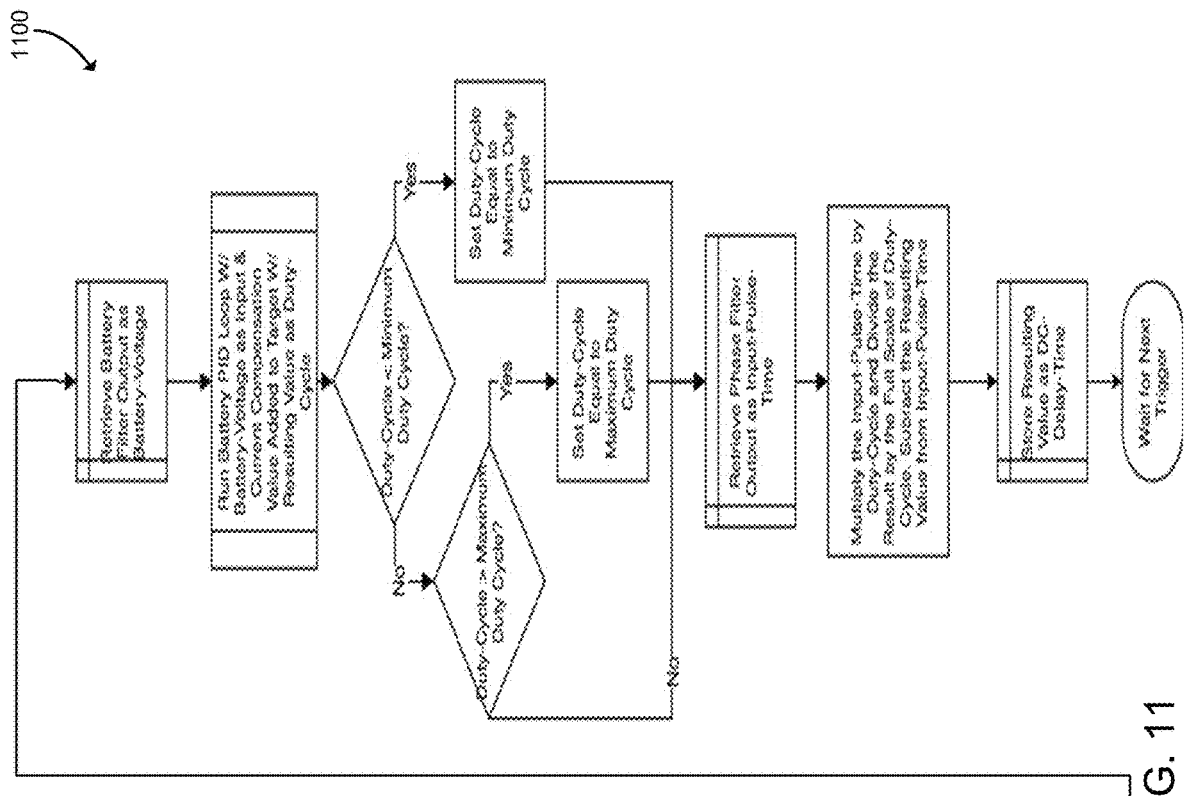
FIG. 11 is a simplified flow diagram of at least one embodiment of a method for a primary control loop that may be executed by the controller of FIG. 4.
Figure 11:
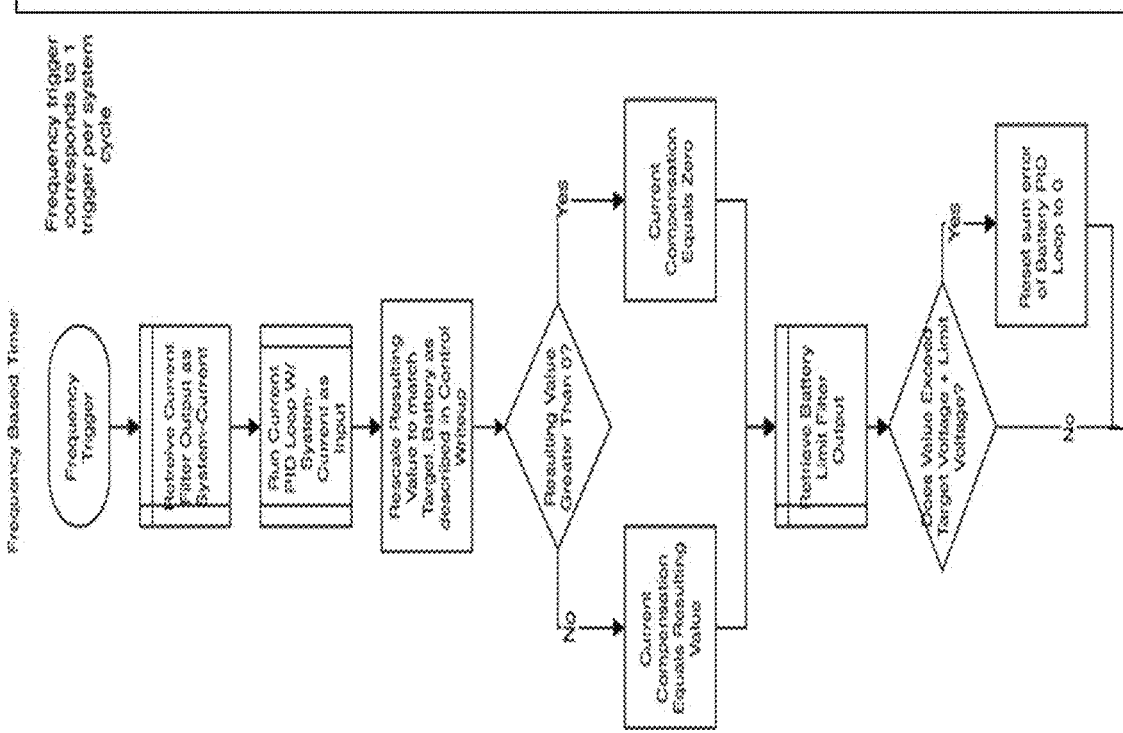

Referring now to FIG. 11, the controller 400 may execute a method 1100 for a primary control loop. The Control Loop has the following input data: Phase Filter output, Battery Filter output, and Current Filter output. The Phase Filter measurement is described further below in connection with FIG. 12. The Battery Filter and the Current Filter are described further below in connection with FIG. 14.

The Control Loop has the following output data: DC-Delay-Time, which is the time delay from input phase becoming active to activating the corresponding output phase. The DC-Delay-Time should be updated at System-Frequency as the alternator is running. For example, at 100 Hz, the update would occur once every 10 ms.

In one potential embodiment, frequency may not be measured (e.g., due to limited supply of timer modules in the controller). In that embodiment, phases may be designated as primary, secondary, and tertiary. When the primary phase detects a rising edge, the device may run one set of calculations (e.g., one iteration of the control loop). If the primary phase has failed, this functionality switches to the secondary phase. If the primary & secondary phases have failed, this functionality switches to the tertiary phase. If all phases have failed control loop will not trigger.

To perform a Current Limit function, the controller may enter the output of the Current Filter (System-Current) into a Current PID Loop as the process variable. The PID loop is described further below in connection with FIG. 15. The output of the PID loop is then scaled into an adjustment factor for the Target_Battery such that: Over current will result in an adjustment to the Target_Battery with equal resolution to the ADC used for Battery-Voltage. During over current conditions, the adjustment value will modify the Battery-Voltage over a range of 0 to 1.5 V as measured at the ADC. The adjustment is incapable of causing the Target_Battery to go higher than its default value (14.5 System Voltage, 1.5 Volts at ADC). This adjustment factor is referred to as Current-Correction. In some embodiments, there may be an EEPROM programmable hysteresis range for engaging or disengaging current control. Additionally or alternatively, in some embodiments, output current may be controlled directly using PID control. For example, the output of the Current Filter may be input into a Current PID Loop as the process variable, using a target current as the set point.

In one potential embodiment, output of the Current Filter System-Current is entered into the Current PID Loop as the process variable. This provides an output on a scale from 0 to 16383 referred to as Current Compensation. This is rescaled to 0 to 1024 by bit-shifting 4 times to the right. This is rescaled to −512 to 512 by subtracting 512. If the resulting value is greater than or equal to 0, no action is taken. If the resulting value is less than 0, it will be added to the target voltage for the Voltage PID loop. In other embodiments, different calculations may be performed, based on characteristics of the controller. For example, the rescaled current compensation may be inverted to be in the range 0 to 512 instead of −512 to 0 and subtracted from the target voltage instead of added, to avoid having to use a signed value.

As described above, the control loop may determine DC_Delay_Time. If the Battery Filter output reads higher than the Battery_Cutoff value, the sum error of the Battery PID Loop will be reset to 0. The sum error is reset happens before the PID loop runs in a given calculation cycle. In some embodiments, the sum error may be reset to a different value, such as −½ Max Sum Error.

The output of the Battery Filter Battery-Voltage is input into the Battery PID Loop (described further below in connection with FIG. 15), which generates the Duty-Cycle value. Duty-Cycle is limited by Min_DC and Max_DC. Using Input-Pulse-Time and Duty-Cycle, DC-Delay-Time is calculated for use in actuating the SCRs as described above in connection with FIG. 10. In particular, DC-Delay-Time may be determined using either of Equations 1 or 2, below. In those Equations, 100% refers to whatever a 100% duty cycle would be on the scale Duty-Cycle uses in the calculations, so if Duty-Cycle exists in the calculations as a range from 0 to 16383, it would be Duty-Cycle/16383.

$$DC\text{-}Delay\text{-}Time=Input\text{-}Pulse\text{-}Time-(Input\text{-}Pulse\text{-}Time*(Duty\text{-}Cycle/100\%)) \quad (1)$$

$$DC\text{-}Delay\text{-}Time=Input\text{-}Pulse\text{-}Time*((100\%-Duty\text{-}Cycle)/100\%) \quad (2)$$

In one potential embodiment, if the Battery Filter output reads higher than the Battery_Cutoff value, the sum error of the Battery PID Loop is reset to 0. This happens before the PID loop runs in a given calculation cycle. This is to prevent load dumps or other sudden event from driving voltage beyond desired limits. The limit may be disabled by setting it to max ADC read, as long as the controller triggers on > and not >=.

The output of the Battery Filter Battery-Voltage is input into the Battery PID Loop. The Current Compensation is also input as a modifier to the target value. This provides an output on a scale from 0 to 16383 referred to as Duty-Cycle. A minimum and maximum Duty-Cycle is applied here if enabled. Each is on a 0 to 16383 scale, with the option to enable or disable. Disabling could simply be setting Min_DC to 0, and Max_DC to 16383. Duty Cycle will be set to the Min_DC if calculation goes below it, and set to the Max_DC if calculation goes above it.

To convert the Duty-Cycle into the DC-Delay-Time used for actuation, the following operation is performed:

$$\text{Phase Filter Output}-(\text{Phase Filter Output}*\text{Duty Cycle})>>14 \quad (3)$$

This scales the measured phase period to the duty cycle (Duty Cycle>>14 is equivalent to a value between 0 and 1) and inverts the time scale because delay time till SCR trigger is inversely proportional to on time (effective duty cycle). The Phase Filter Output can be used directly because the later described PWM output works on the same 250 ns per count as the phase measurement. If this were to change an adjustment may be needed.

Figure 12:
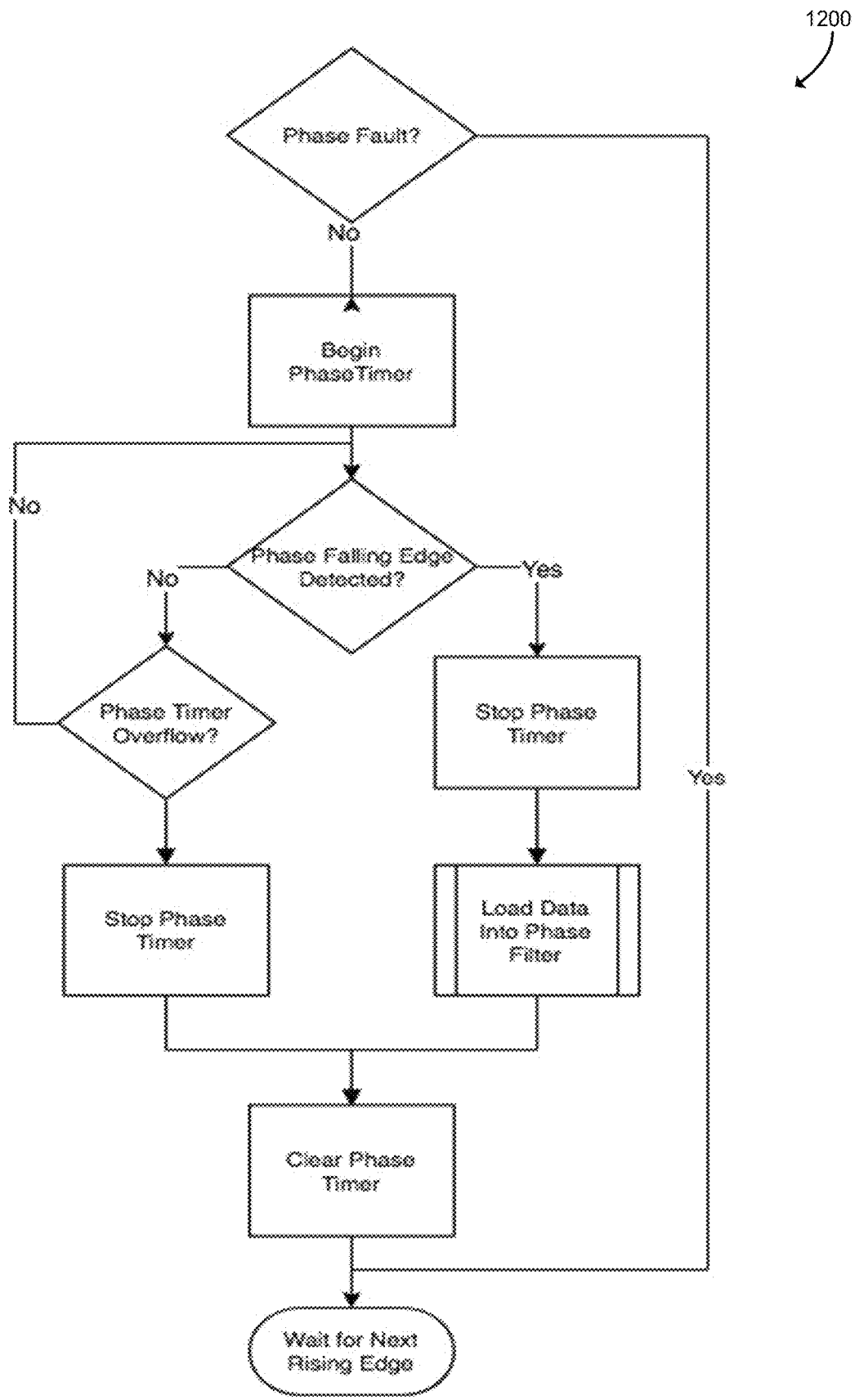
FIG. 12 is a simplified flow diagram of at least one embodiment of a method for measuring active signal time that may be executed by the controller of FIG. 4.

Referring now to FIG. 12, the controller 400 may execute a method 1200 for measuring active signal time. As shown, input pulse width may be measured from rising edge to falling edge. Note that any reference to the input pulse signal ignores inversion or other manipulation to the signal within the device. Thus, a rising edge refers to the alternator output signal going high, and a falling edge refers to it going low. The input signal being referred to as active means that it is high at the alternator output, and inactive means that it is low at the alternator output. Any controller behavior depending on this will have to implement the proper polarity to reverse any changes caused in the circuitry. Thus, in some embodiments, the controller may include an EEPROM setting which inverts this to "from falling edge to rising edge" for use in a high side diode, low side SCR variant.

Each of the 3 phases is measured in this way independently, each time it is active. These measured values are fed into the phase filter (described below), the output of which labeled Input-Pulse-Time may be used in control calculations. If a reading exceeds the maximum measurable time, it will be discarded and the ongoing measurement will be stopped.

The controller may implement multiple filters (e.g., the Phase Filter, the Battery Filter, and the Current Filter) using the same algorithm. In particular, each filter may be embodied as an infinite impulse response (IRR) filter. In one potential embodiment, each filter stores 3 data values (data types can be changed as needed): Sum, Output, and Index. Sum is the moving sum value of the filter. Output is the final filtered value. Index determines the weighting of the filter, and is the only preset value. Suma and Output are derived during operation from the Index value and the Input-Sample value. An index value of 0 functions as if there were no filter.

The Filter has one input value: Input-Sample, which is a Data point being passed into filter. The filter is called with the input and the data set of 3 stores values and performs the following operations. The sum value is updated using the new Input-Sample as described in Equation 4. In Equation 4, >> is a right bit shift operator. The Output is updated based on the new sum as described in Equation 5. The Output could be immediately returned after the operation, or retrieved from storage as needed for calculations.

$$\text{New sum}=\text{Old sum}-(\text{Old sum}>>\text{Index})+\text{Input-Sample} \quad (4)$$

$$\text{New Output}=\text{New sum}>>\text{Index} \quad (5)$$

The controller may provide four filters: Phase Filter (input is Input-Pulse-Time), Battery Filter (input is Battery-Voltage), Current Filter (input is System-Current), and Frequency Filter (input is System-Frequency).

Figure 13:
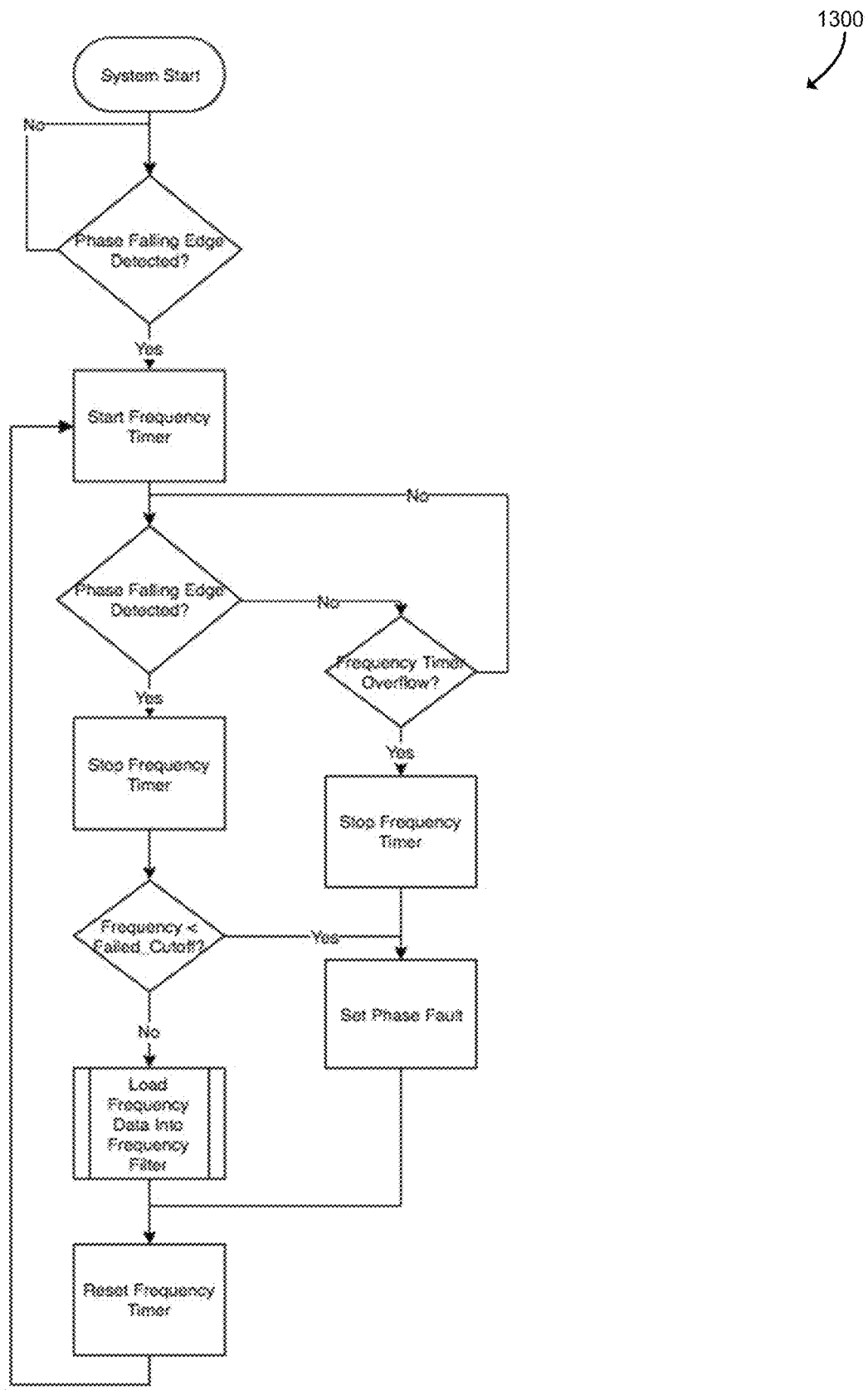
FIG. 13 is a simplified flow diagram of at least one embodiment of a method for measuring input phase frequency that may be executed by the controller of FIG. 4.

Referring now to FIG. 13, the controller 400 may execute a method 1300 for measuring input phase frequency. The measured frequency may be used to control operation mode and to detect phase faults. Frequency may be measured from falling edge to falling edge of the input pulse signal. Frequency is measured individually on each phase to avoid any loss of phases (e.g., phase fault) causing unwanted mode transition or total device lockdown. As shown, measurements are loaded into the Frequency Filter (as described above), the output of which may be used by the controller as System-Frequency as described above.

The controller is capable of recognizing when a phase has failed. A phase is considered failed when no activity has been detected on it for a period of Failed_Cutoff. Detection of phase failure may be implemented as a response to overflow on System-Frequency measurements, as this cutoff is derived from the minimum frequency measurement required by the system. If a phase is failed, its associated output is suppressed, and, if in the cases of being stuck with the input active. Once a phase failure is detected, any input pulse or frequency measurements ongoing on the phase should be discarded and not entered into their respective filters. The same should be done if an overflow occurs in either measurement.

Figure 14:
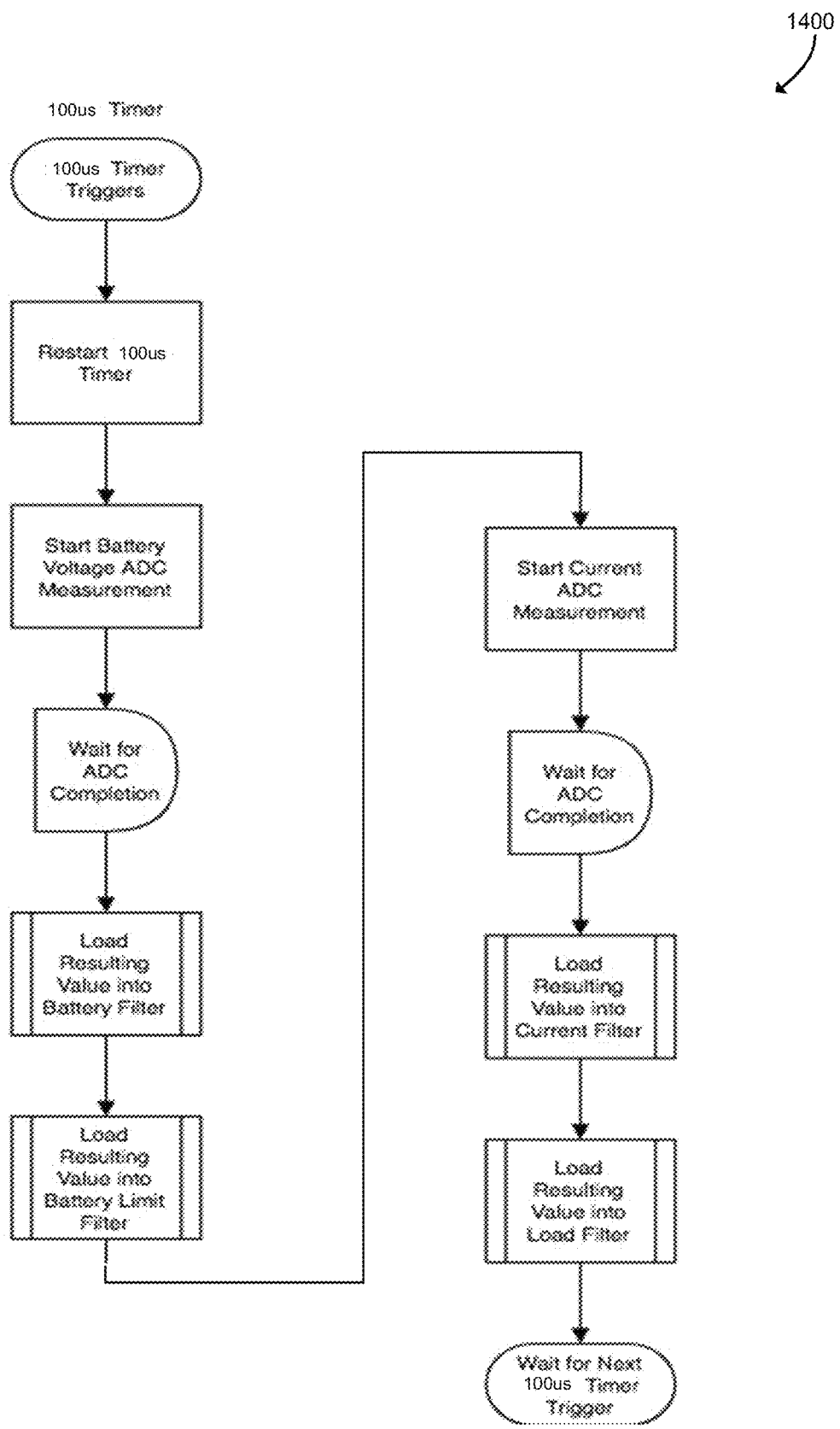
FIG. 14 is a simplified flow diagram of at least one embodiment of a method for analog to digital converter measurement that may be executed by the controller of FIG. 4.

Referring now to FIG. 14, the controller 400 may execute a method 1400 for analog to digital converter measurement. As shown, Battery Voltage may be measured every 100 µs. The Voltage reading is passed into the Battery Filter (as described above). The required resolution and range may be equal to that of the Target_Battery value. If after 3 Volt subtraction or other changes, PID values may need to be adjusted if resolution has changed. Similarly, a Current reading will be passed into the Current Filter (as described above). The required resolution and range may given by System-Current in the parameter table. PID values may be adjusted based on characteristics of the Current Sense implementation in the controller.

In an embodiment, ADC measurements may be taken every 100 µs. Every 100 µs, the ADC starts the battery voltage measurement, which takes 23 µs running in the background, the reading is recorded, and the current measurement is started, which takes 23 μs running in the background, and is then recorded. The voltage value is passed to the Battery Filter, and the current value is passed to two filters, the Current Filter, and the Load Filter (as described above). The next ADC cycle starts 100 μs after the start of the current cycle (100 μs timer reset immediately after calling for the voltage read to begin).

The ADC may measure voltage with Vdd and Vss as references (e.g., 0V to 5V scale). In an embodiment, the ADC may measure 15.78 mV of system battery per ADC count. The ADC may measure 4.88 mV at the pin per ADC count. Each volt at the pin equals 3.234 V in the system. In an embodiment, 0 A of current may correlate to 0.5 V at the ADC pin. The ADC measures 4.88 mV at the pin per ADC count. Past 0.5 V, each volt correlates to 25.714 A in the system. Past 0.5 V, each ADC count correlates to 0.1255 A in system per ADC count.

Figure 15:
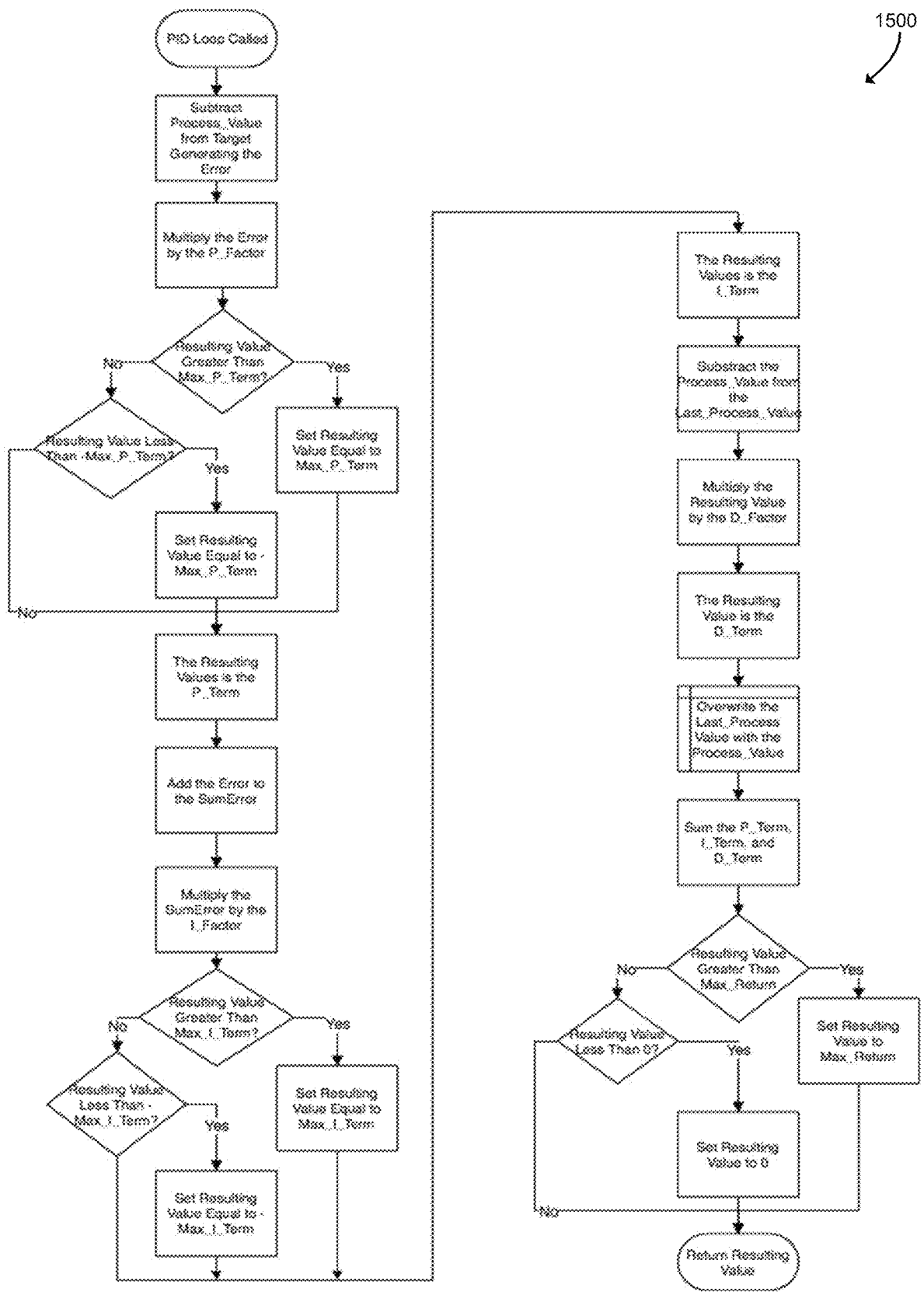
FIG. 15 is a simplified flow diagram of at least one embodiment of a method for a proportional-integral-derivative control loop that may be executed by the controller of FIG. 4.

Referring now to FIG. 15, the controller 400 may execute a method 1500 for a proportional-integral-derivative (PID) control loop. The controller may maintain a Battery PID loop and a Current PID loop using the same PID loop method. Each PID Loop is comprised of the following values: Input, Target, and Output. Any limits and ranges on these values will be derived from the specific value being used. Input is the Process Variable that is used to monitor the state of the system. Target is the desired value of the process variable, behavior of the control loop is determined by the difference between the process variable and target. Output is the manipulated variable, the aspect being used to manipulate the system and control the process variable.

The PID loop uses multiple parameters. Error is Target-Input, and can be negative. Error may be limited such that it cannot result in a P_Term greater than +/−100% of maximum output value. Sum Error is a running accumulator of the error each time the loop is called and can be negative. Sum Error is limited such that it cannot result in a I_Term greater than +/−100% of maximum output value. Last Process Value is a previously measured input, used in calculation of D Term. Limits may be derived from Input value. P Factor is a relative weighting of error term in calculation of manipulated variable. P Term is the product of multiplying error and P Factor. I Factor is a relative weighting of sum error term in calculation of manipulated variable. I Term is the product of multiplying sum error and I Factor. D Factor is a relative weighting of rate of change of process variable in calculating manipulated variable. D Term is a product of multiplying rate of change and D Factor.

The PID loop calculates error by subtracting the Input from the target. Error is multiplied by the P Factor to generate the P Term. Error is added to Sum Error. Sum Error is multiplied by I Factor to generate the I Term. Last Process Value-Input is multiplied by D Factor in order to generate D Term. The P Term, I Term, and D Terms are summed. The resulting value is limited to a range of 0 to 16383, and the resulting value is returned as the manipulated variable.

In the Battery PID Loop, for voltage control, Battery-Voltage is the process variable, and Duty-Cycle is the manipulated variable. The set point for the process variable is Target_Battery. The current weights of the PID values may be stored as B_P_Factor, B_I_Factor, and B_D_Factor, for example as programmable values in EEPROM. In the Current PID Loop, System-Current is the process variable, and Current-Correction is the manipulated variable. The set point for the process variable is Target_Current. The current weights of the PID values may be stored as C_P_Factor, C_I_Factor, and C_D_Factor, for example as programmable values in EEPROM.

Figure 16:
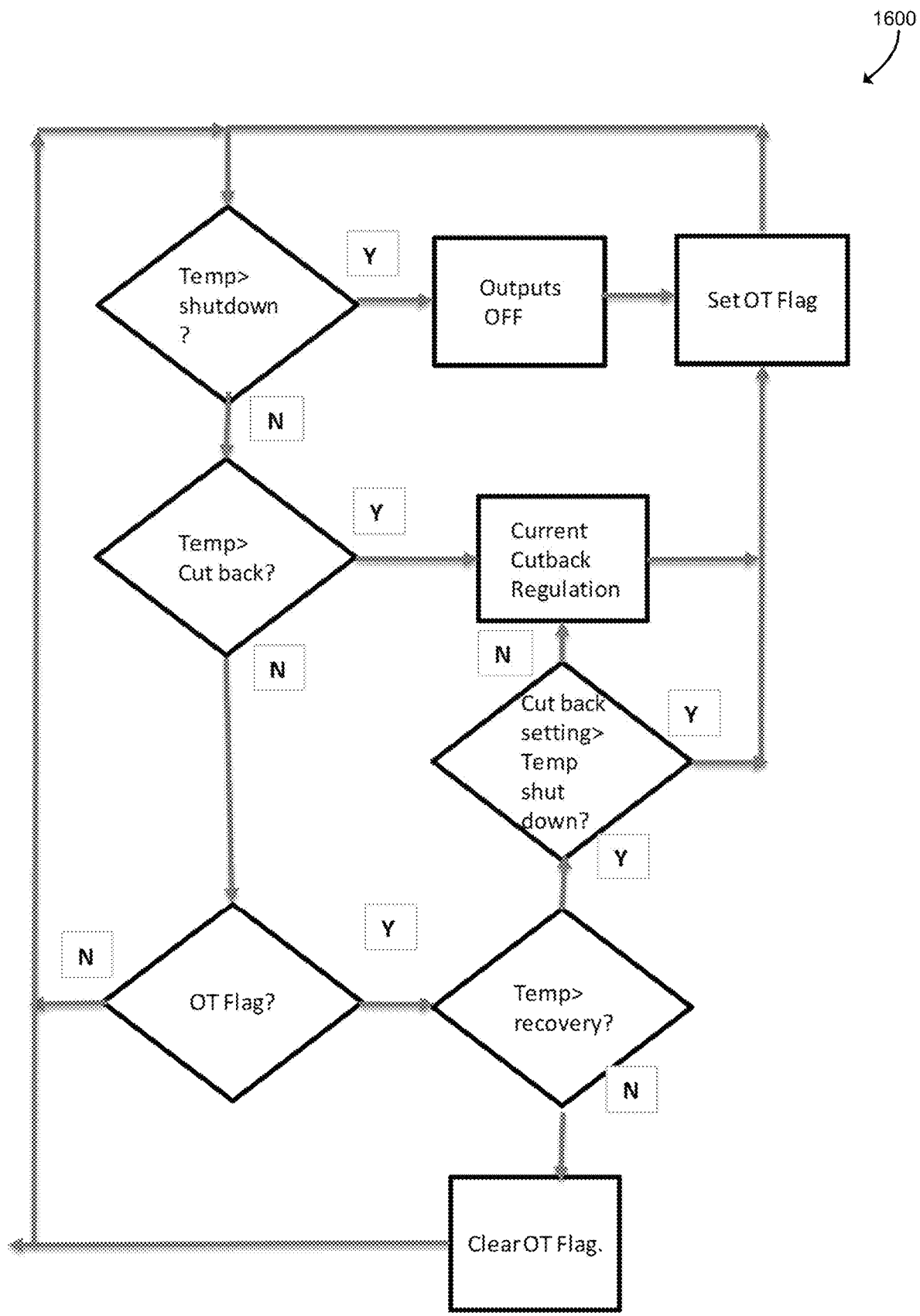
FIG. 16 is a simplified flow diagram of at least one embodiment of a method for over-temperature monitoring that may be executed by the controller of FIG. 4.

Referring now to FIG. 16, the controller 400 may execute a method 1600 for over-temperature monitoring. The case temperature of the external SCRs may be indirectly monitored by a temperature sensing circuit internal to the controller. If the temperature exceeds the temperature limit, output pins S1-S4 are controlled such to reduce the temperature. Two thermal limits are afforded. The first limit (Cutback) reduces output duty cycle to programed current, and the second limit (Shutdown) commands outputs to full off. Hysteresis is afforded in the controller to re-enable normal operation if temperature has dropped below a hysteresis temperature. Limits may be programmable in an EEPROM.

Figure 17:
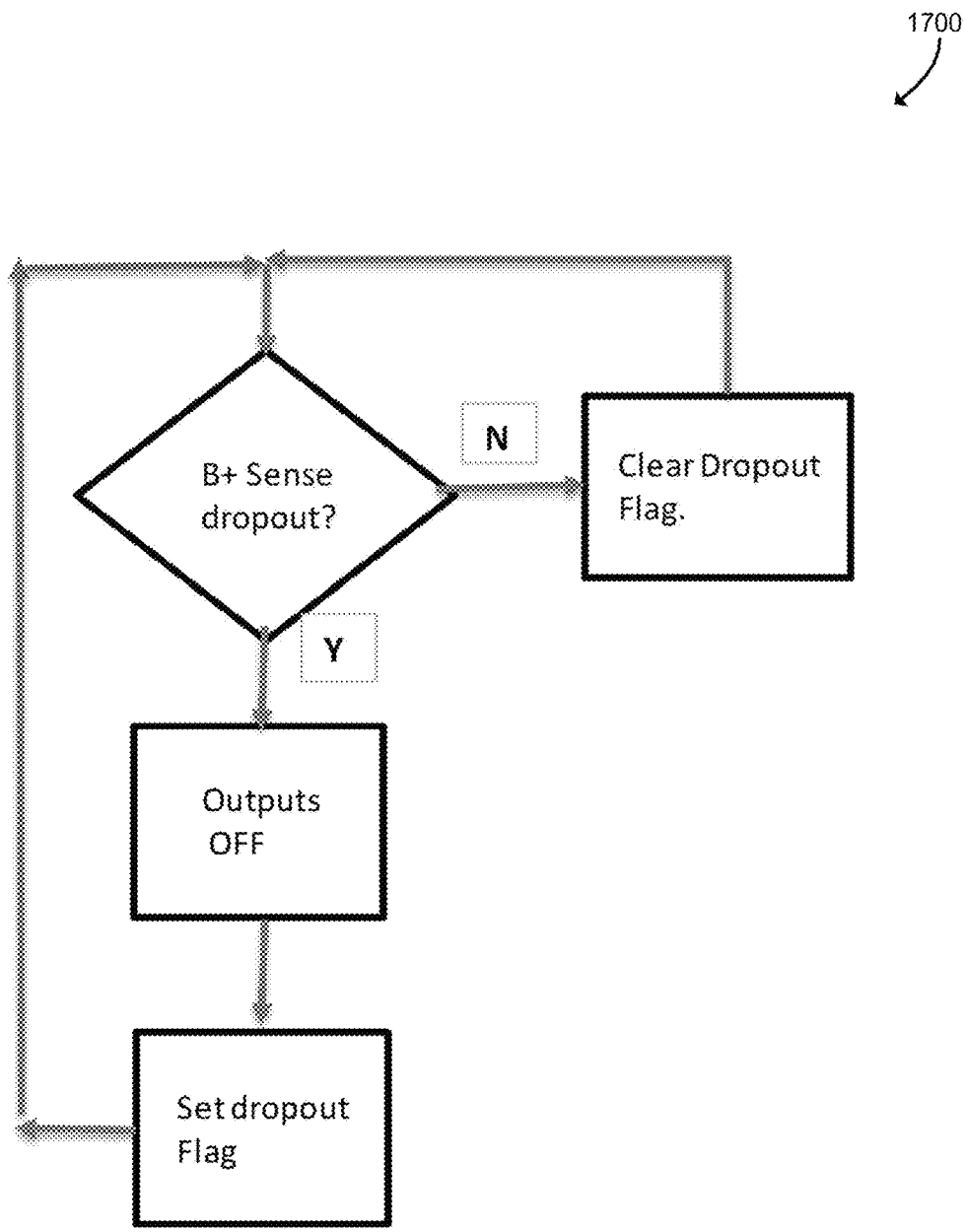
FIG. 17 is a simplified flow diagram of at least one embodiment of a method for battery sense monitoring that may be executed by the controller of FIG. 4.

Referring now to FIG. 17, the controller 400 may execute a method 1700 for battery sense monitoring.

Figure 18:
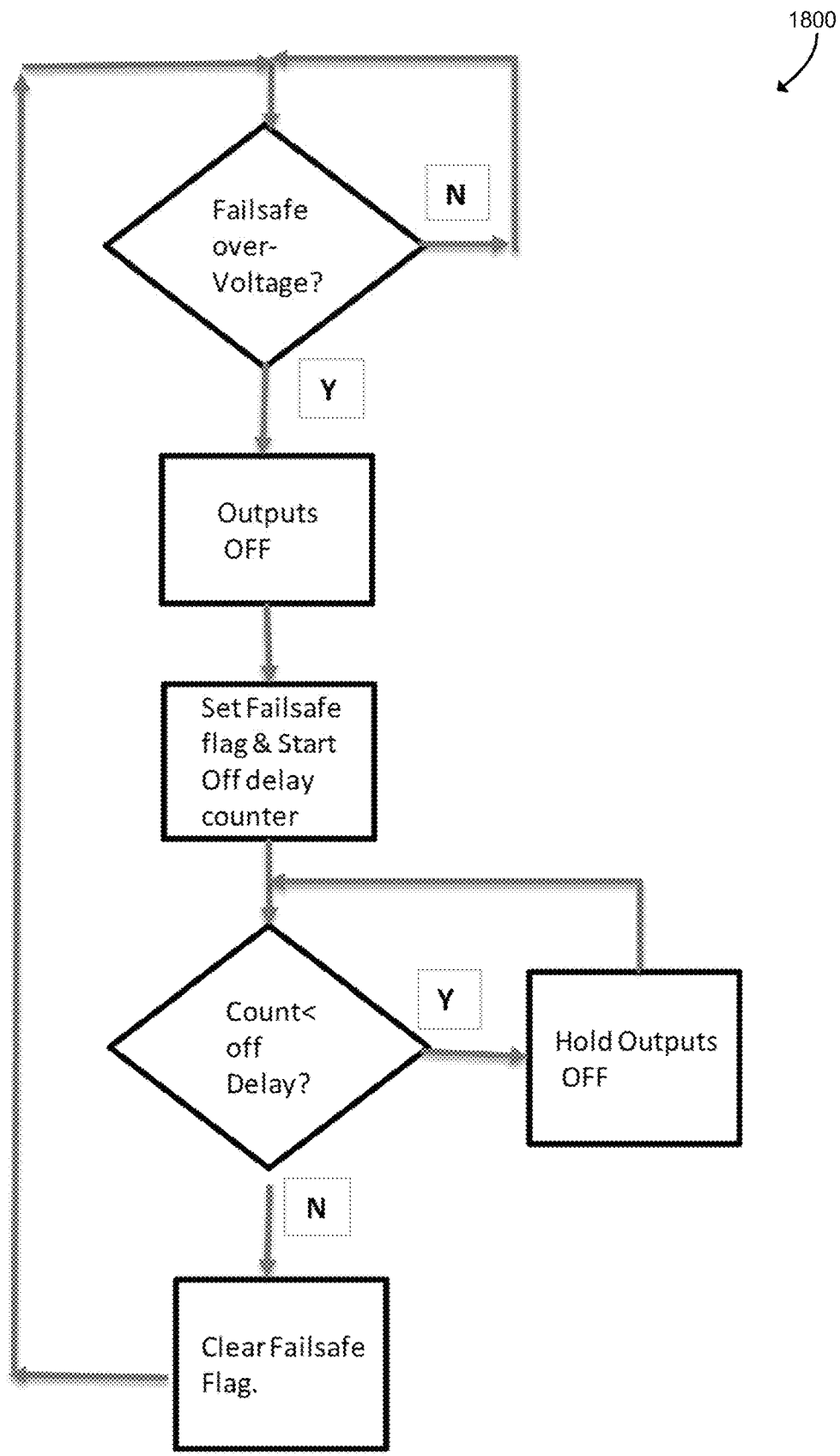
FIG. 18 is a simplified flow diagram of at least one embodiment of a method for failsafe over-voltage monitoring that may be executed by the controller of FIG. 4.

Referring now to FIG. 18, the controller 400 may execute a method 1800 for failsafe over-voltage monitoring. An over voltage condition such as may occur during a load dump is detected by monitoring the VCC Pin. In the event of an over voltage condition (Failsafe OV), the SCR outputs are shut OFF. To avoid repeated load dumps from occurring, the outputs S1-S4 are inhibited from turning back on for a fixed time period (failsafe OFF Delay). This delay allows time for B+ clamping components (external TVS) and circuitry to recover and to cool. The over voltage comparator circuit within the controller shall have a defined level of hysteresis to prevent output oscillation due to ripple on the VCC pin. An external pin is provided in the controller (OV SET) to adjust the over voltage trip level, which may be required for different applications.

Figure 19:
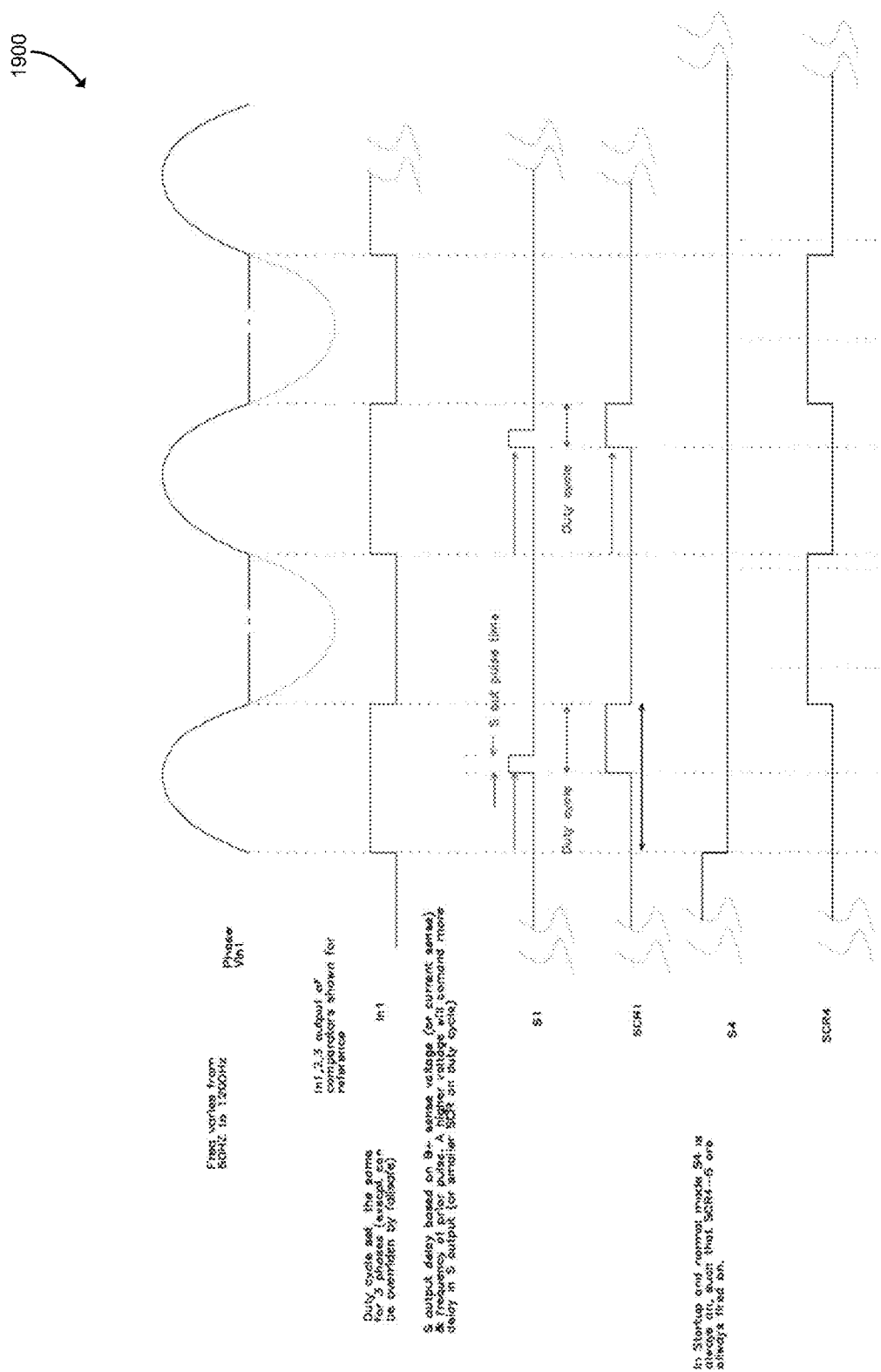
FIG. 19 is a plot illustrating signals of the system of FIGS. 1-3 in normal or startup mode.

Referring now to FIG. 19, plot 1900 illustrates signals of the system of FIGS. 1-3 in normal or startup mode. As shown, an oscillating input signal is measured on phase Vin1. An S output delay is determined based on the required duty cycle. After waiting the S output delay time from the rising edge of the Vin1 signal, a pulse of width S out pulse time is asserted on the S1 driver. The associated SCR1 latches on and remains on until the phase Vin1 signal goes low. Inputs Vin2, Vin3, output drivers S2, S3, and SCRS SCR2, SCR3 have the same waveforms nominally spaced 120 degrees apart. In other words, after waiting the S output delay time (which is the same delay time for all phases) from the rising edge of the Vin2 signal, a pulse of width S out pulse time is asserted on the S2 driver. Similarly, after waiting the S output delay time (which is the same delay time for all phases) from the rising edge of the Vin3 signal, a pulse of width S out pulse time is asserted on the S3 driver. In startup and normal mode, S4 is always on, such that SCR4, SCRS, SCR6 are always fired on.

Figure 20:
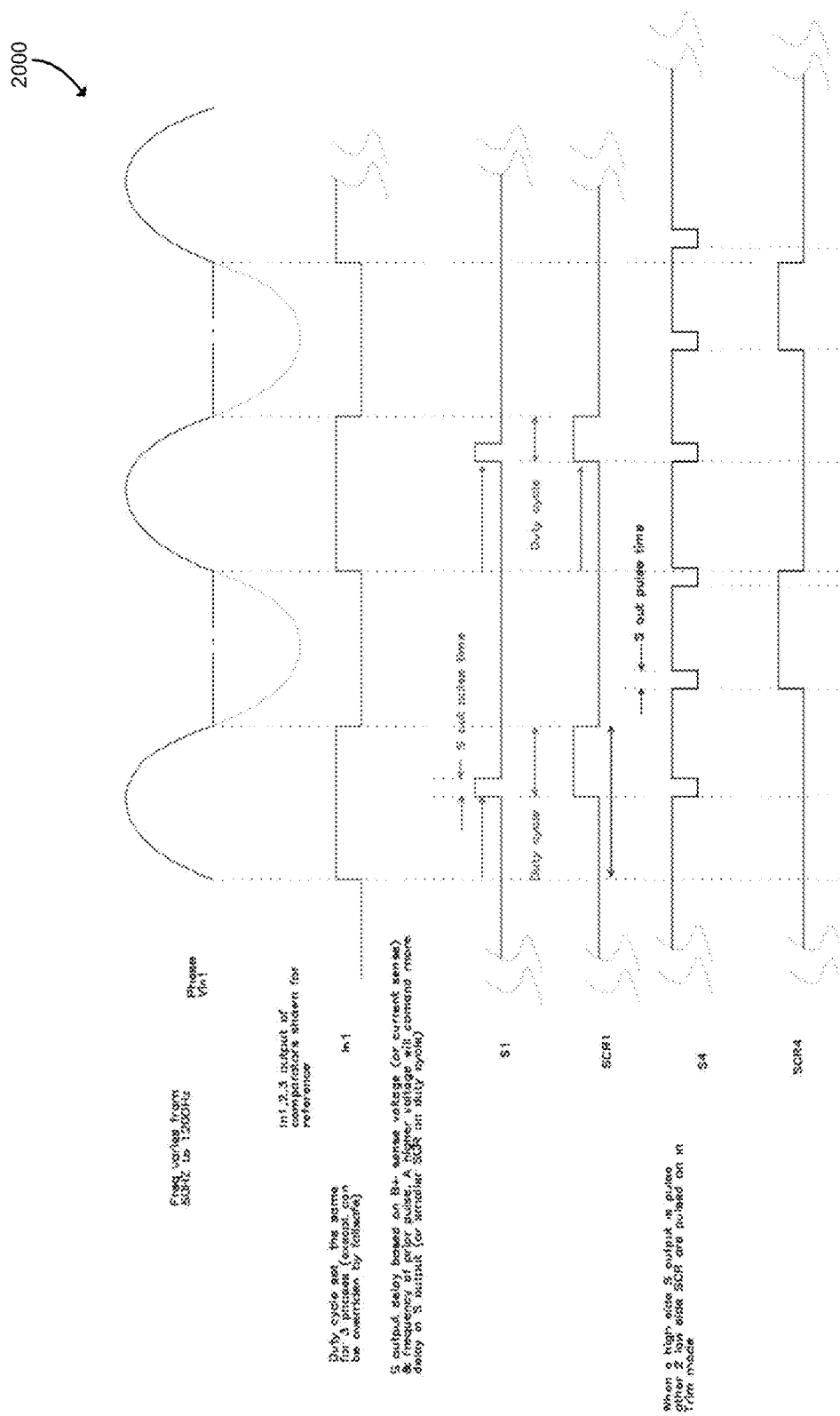
FIG. 20 is a plot illustrating signals of the system of FIGS. 1-3 in trim mode.

Referring now to FIG. 20, plot 2000 illustrates signals of the system of FIGS. 1-3 in trim mode. Similar to startup and normal mode, after waiting the S output delay time from the rising edge of any of phases Vin1, Vin2, Vin3, a pulse of width S out pulse time is asserted on the associated S1, S2, S3 driver. As described above, Inputs Vin2, Vin3, output drivers S2, S3, and SCRS SCR2, SCR3 have the same waveforms nominally spaced 120 degrees apart. In trim mode, when a high side S output (e.g., S1, S2, S3) is pulsed, the other two low side SCRs are pulsed on. Illustratively, pulses are asserted on S4 at the same time as each pulse on S1, S2, S3 (e.g., 120 degrees apart).

Figure 21:
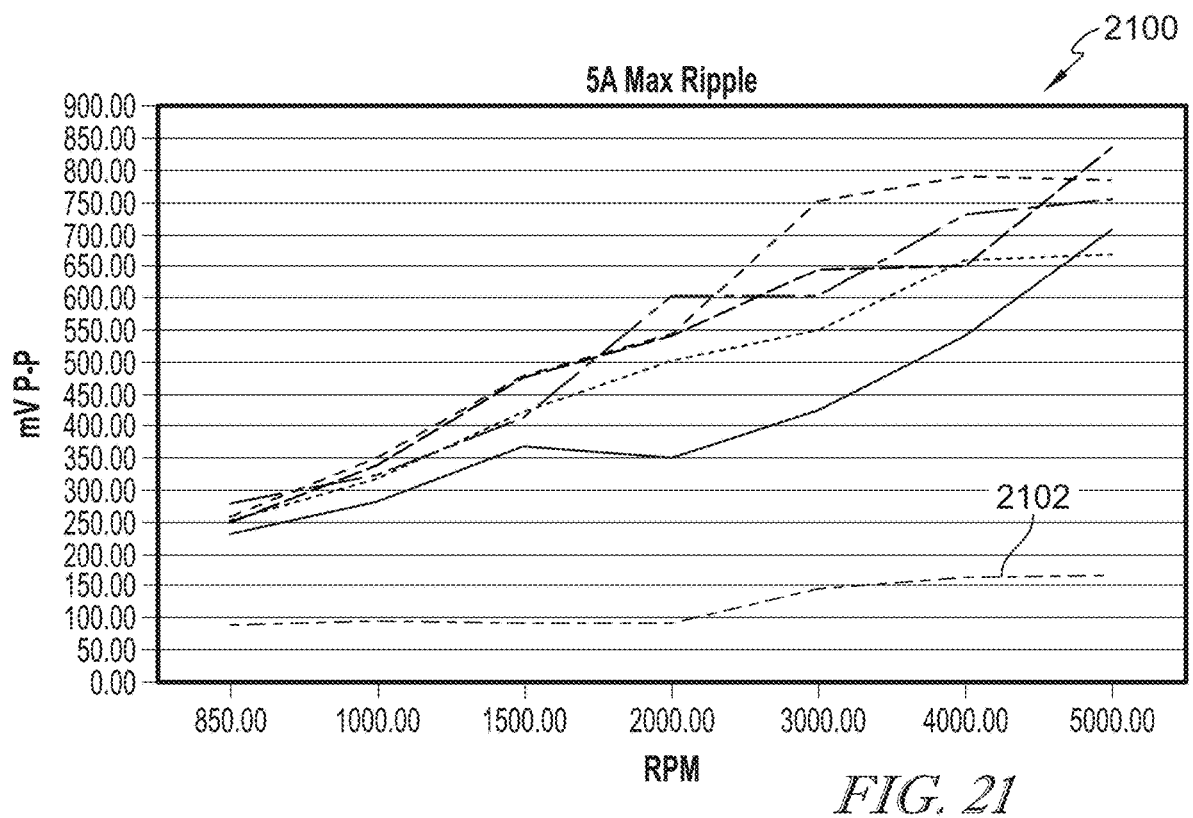
FIGS. 21-27 are plots illustrating experimental results that may be achieved with the system of FIGS. 1-3.
Figure 22:
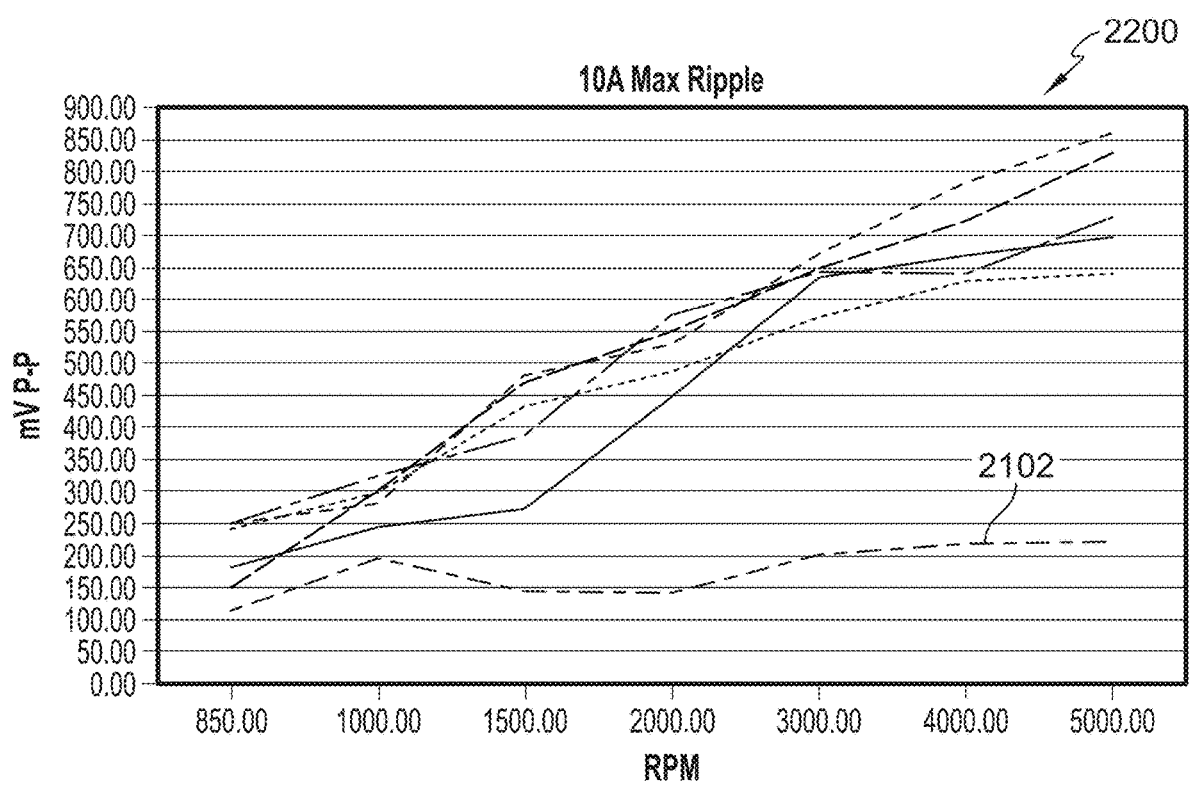
Figure 23:
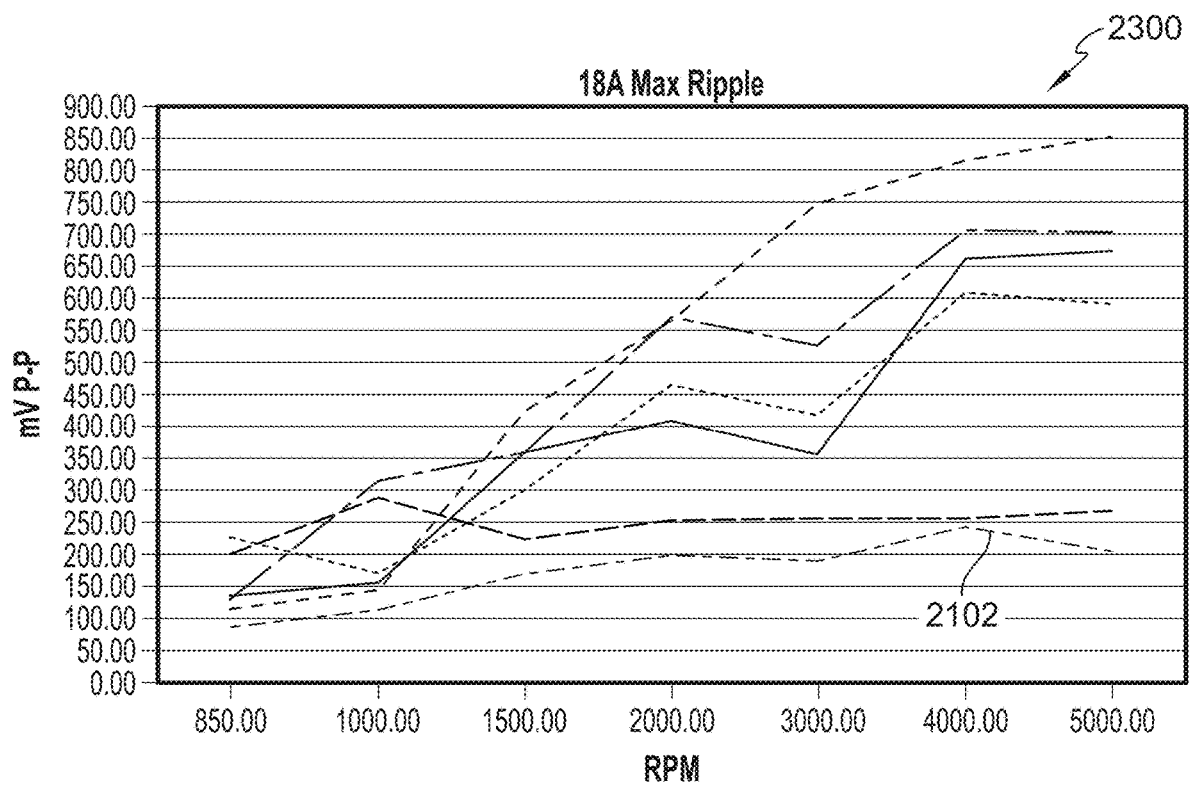
Figure 24:
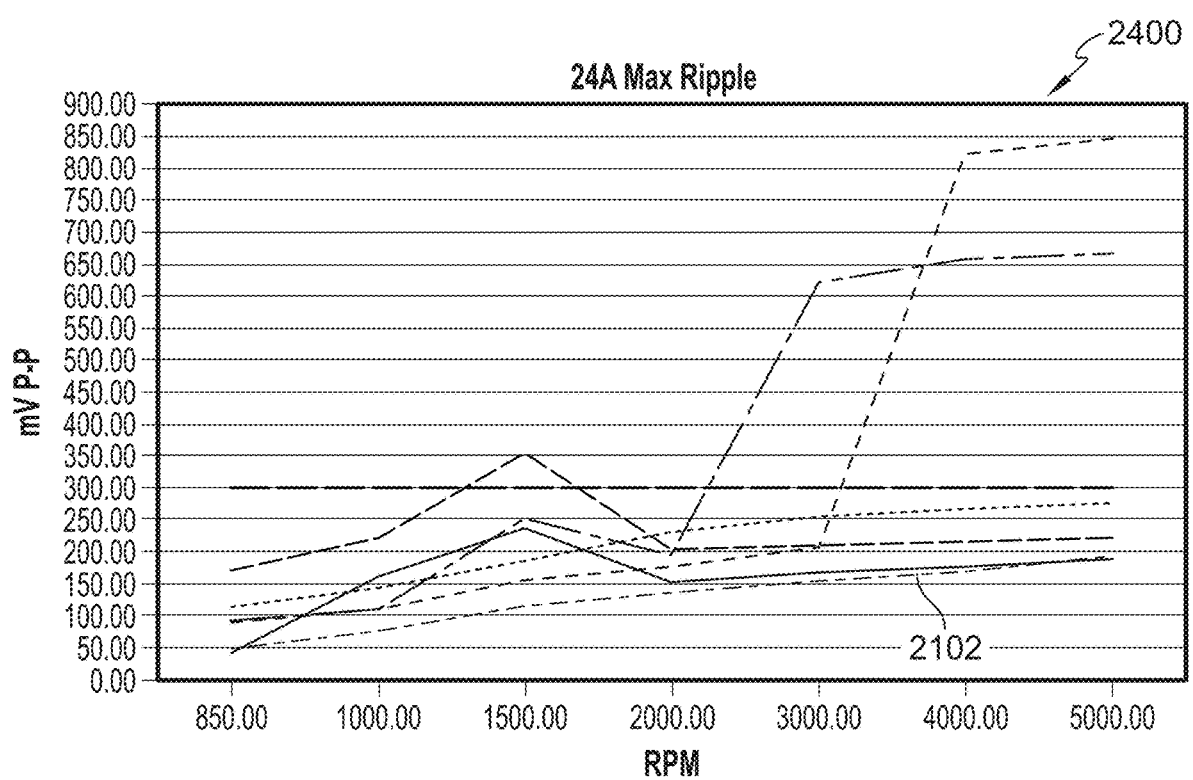
Figure 25:
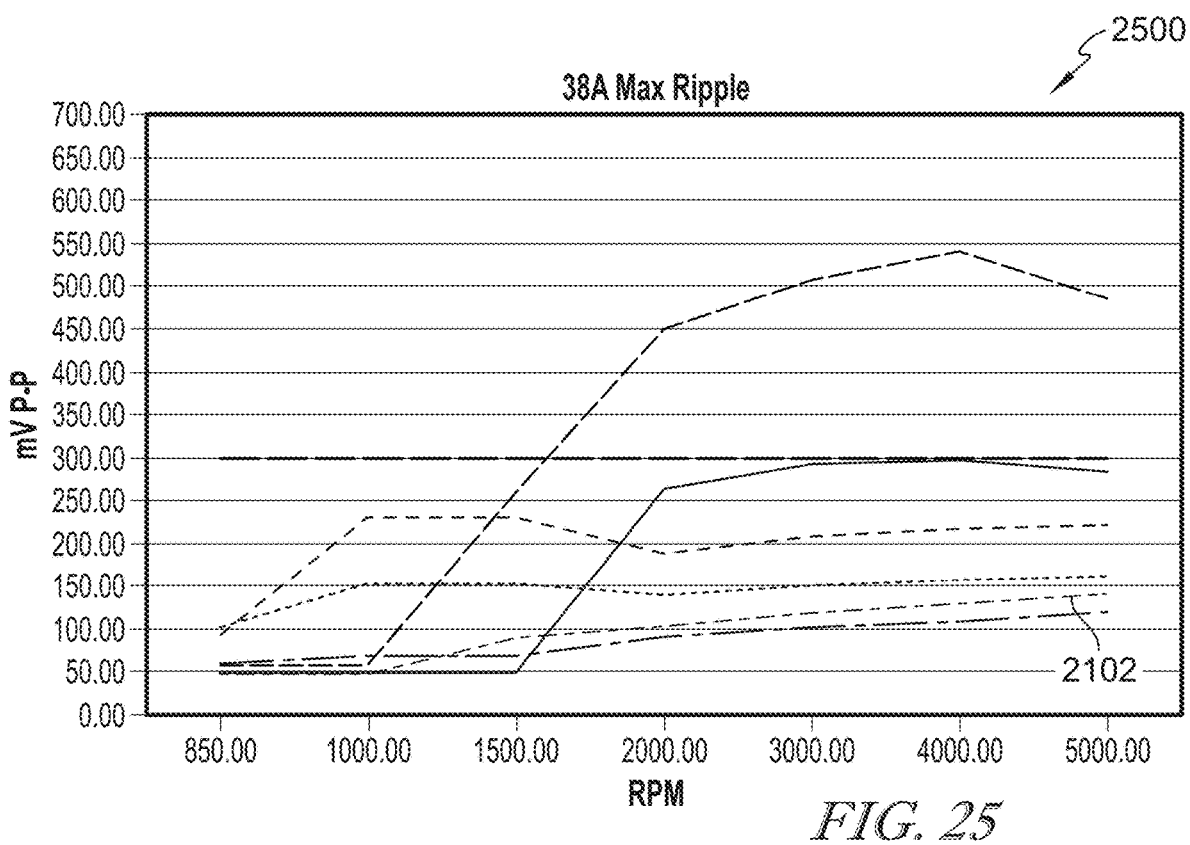
Figure 26:
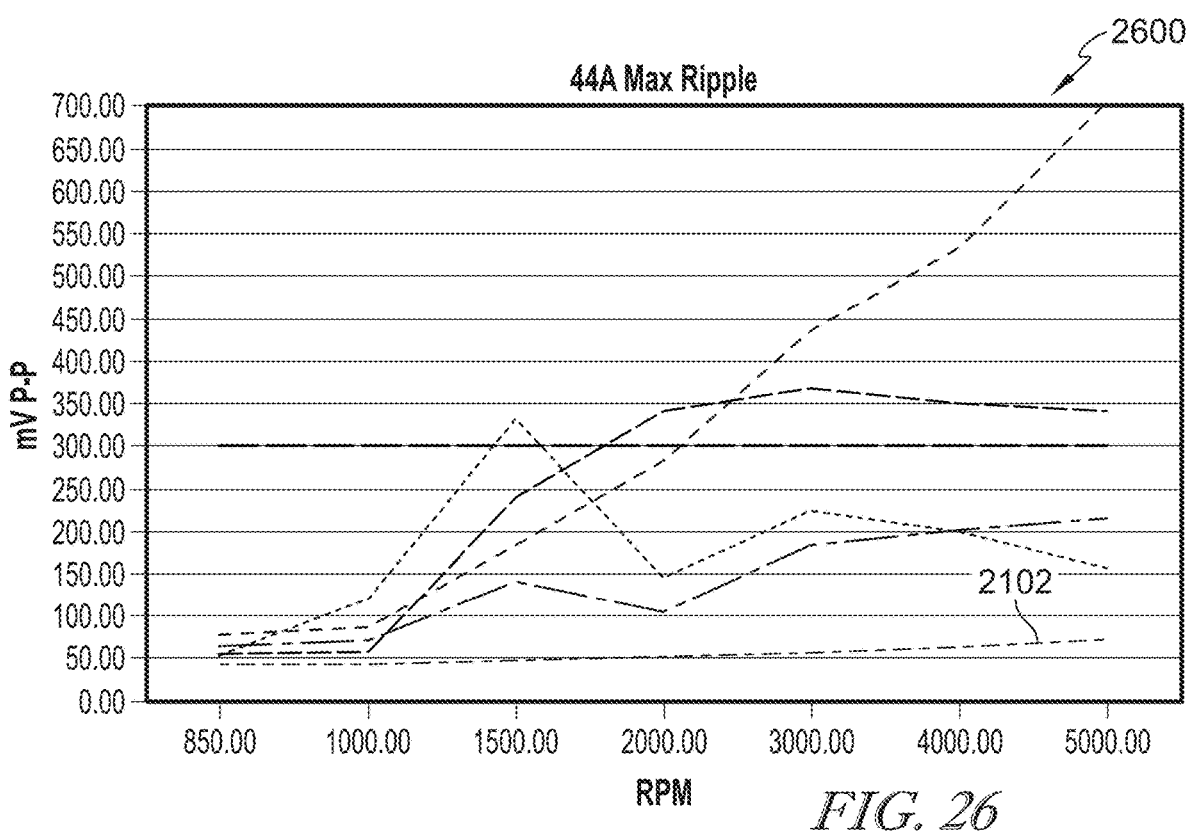
Figure 27:
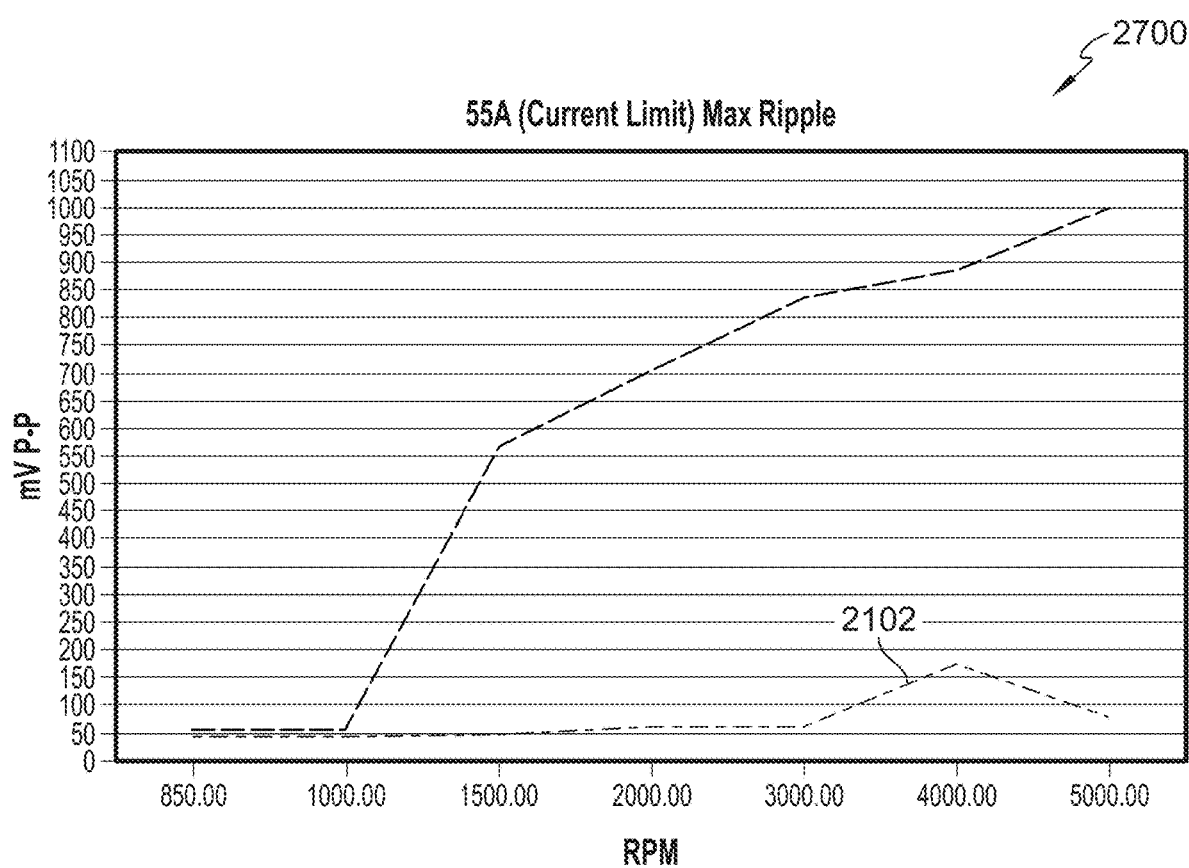

Referring now to FIG. 21, plot 2100 illustrates voltage ripple measured against frequency at 5A current for the controller as disclosed herein as compared to multiple existing voltage regulation/rectification systems. Curve 2102 represents experimental results that may be achieved using the controller and system as described herein. Referring now to FIGS. 22-27, similar results are plotted for experiments performed with increasing current levels. As shown, the system disclosed herein may have reduced ripple as compared to existing voltage regulation/rectification systems.

Figure 28:
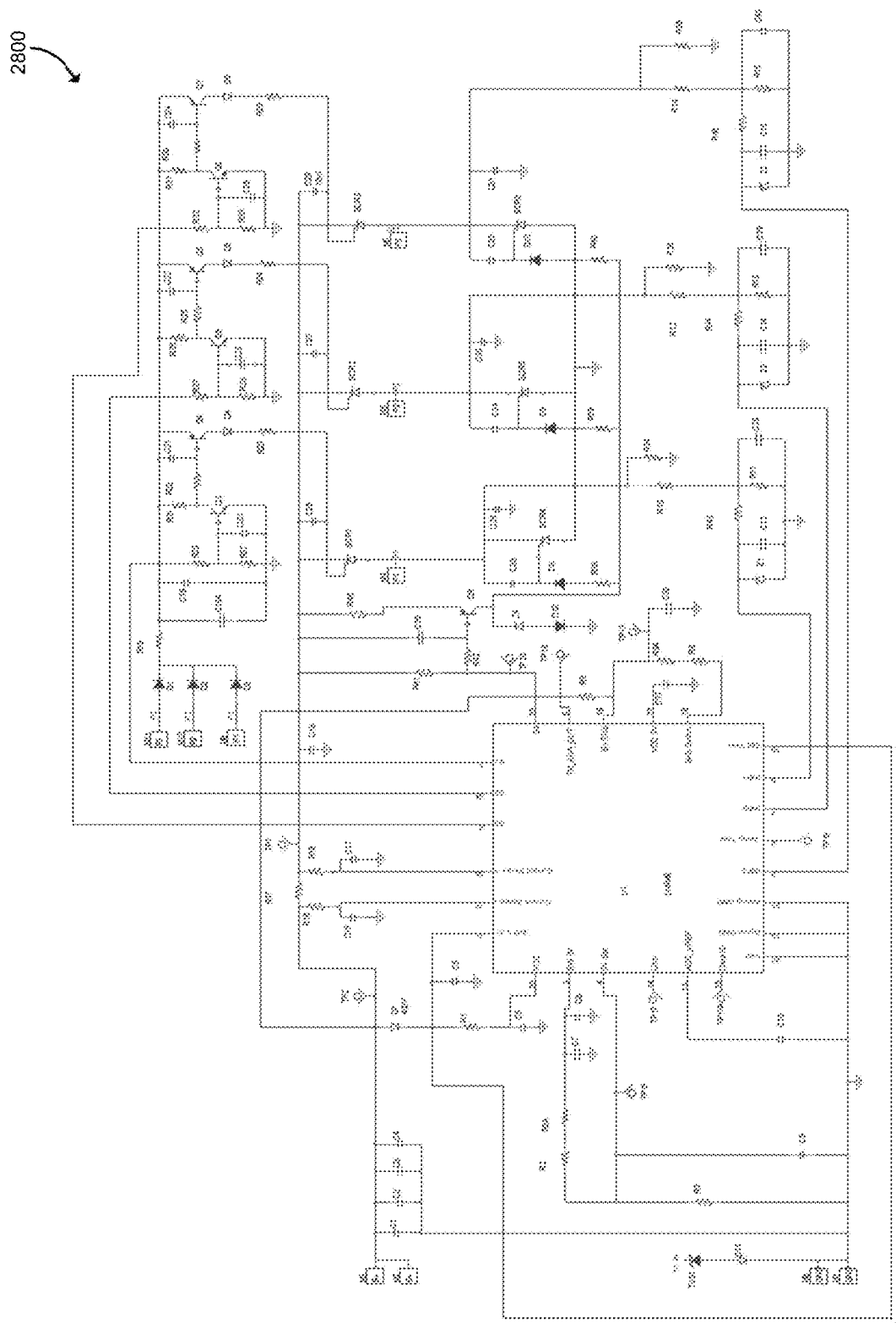
FIG. 28 is a schematic diagram of at least one embodiment of a circuit that may be used with the system of FIGS. 1-3.

Referring now to FIG. 28, schematic diagram 2800 illustrates one potential embodiment of an electrical circuit that may be used with the system of FIGS. 1-3. As shown, the diagram 2800 includes a controller U1. The controller U1 may be embodied as a controller 400 as described above.

The invention claimed is:

1. A controller for alternating current regulation control, the controller configured to:
   determine a voltage duty cycle based on a target voltage;
   determine a delay time based on the voltage duty cycle; and
   for each input phase of an alternating current generator having a plurality of phases, wherein each phase is coupled to a silicon controlled rectifier of a plurality of silicon controlled rectifiers:
   identify a rising edge asserted on the input phase;
   wait the delay time after identifying the rising edge; and
   assert an output pulse on an output driver coupled to the silicon controlled rectifier coupled to the input phase in response to waiting the delay time.

2. The controller of claim 1, wherein the controller is configured to identify the rising edge asserted on the input phase and deglitch filtering the input phase.

3. The controller of claim 1, wherein the controller is further configured to:
   measure output current of the plurality of silicon controlled rectifiers;
   determine a current compensation value in response to measuring the output current; and
   reduce the target voltage by the current compensation value.

4. The controller of claim 1, wherein the controller is further configured to determine the voltage duty cycle based on a target current.

5. The controller of claim 1, wherein the controller is configured to determine the voltage duty cycle by periodically measuring voltage of a battery coupled to the plurality of silicon controlled rectifiers.

6. The controller of claim 5, wherein the controller is configured to determine the voltage duty cycle by:
   filtering the voltage of the battery to generate a filtered voltage; and
   determining the voltage duty cycle based on the filtered voltage.

7. The controller of claim 6, wherein the controller is configured to determine the voltage duty cycle with a proportional-integral-derivative control routine based on the filtered voltage and the target voltage.

8. The controller of claim 1, wherein the controller is configured to determine the voltage duty cycle by:
   measuring output current of the plurality of silicon controlled rectifiers;
   filtering the output current to generate a filtered current; and
   determining the voltage duty cycle based on the filtered current.

9. The controller of claim 8, wherein the controller is configured to determine the voltage duty cycle with a proportional-integral-derivative control routine based on the filtered current and a target current.

10. The controller of claim 1, wherein the controller is further configured to measure a frequency of each input phase of the alternating current generator.

11. The controller of claim 10, wherein to measure the frequency further comprises to filter the frequency of each input phase to generated a filtered system frequency.

12. The controller of claim 1, wherein the controller is further configured to:
   determine an active signal time for an input phase of the plurality of phases; and
   filter the active signal time to generate a filtered active signal time;
   wherein to determine the delay time further comprises to determine the delay time based on the voltage duty cycle and the filtered active signal time.

13. The controller of claim 1, wherein the controller is further configured to:
   detect a fault condition; and
   suppress output of one or more of the plurality of silicon controlled rectifiers in response to detecting the fault condition.

14. The controller of claim 13, wherein the fault condition comprises a phase fault, an over-temperature fault, a battery sense fault, or an over-voltage fault.

15. The controller of claim 1, wherein the plurality of silicon controlled rectifiers comprises a plurality of high-side silicon controlled rectifiers, and the controller is further configured to:
   activate a plurality of low-side silicon controlled rectifiers coupled to the plurality of phases while operating in a normal mode.

16. The controller of claim 15, wherein the controller is further configured to activate the plurality of low-side silicon controlled rectifiers in response to waiting the delay time while operating in a trim mode.

* * * * *